US011928186B2

(12) United States Patent
Jadhav et al.

(10) Patent No.: US 11,928,186 B2
(45) Date of Patent: Mar. 12, 2024

(54) COMBINED DEEP LEARNING AND KNOWLEDGE DRIVEN REASONING FOR ARTIFICIAL INTELLIGENCE CLASSIFICATION

(71) Applicant: International Business Machines Corporation, Armonk, NY (US)

(72) Inventors: Ashutosh Jadhav, San Jose, CA (US); Tanveer Syeda-Mahmood, Cupertino, CA (US); Mehdi Moradi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 17/515,689

(22) Filed: Nov. 1, 2021

(65) Prior Publication Data

US 2023/0135706 A1   May 4, 2023

(51) Int. Cl.
*G06F 18/21* (2023.01)
*G06F 18/214* (2023.01)
(Continued)

(52) U.S. Cl.
CPC .......... *G06F 18/217* (2023.01); *G06F 18/214* (2023.01); *G06N 20/00* (2019.01);
(Continued)

(58) Field of Classification Search
CPC ..... G06F 18/217; G06F 18/214; G06N 20/00; G06N 3/048; G06N 3/088; G06N 3/09;
(Continued)

(56) References Cited

U.S. PATENT DOCUMENTS 10,289,951 B2 *   5/2019   Wang .................. G06V 10/774
2003/0144886 A1   7/2003   Taira
(Continued)

FOREIGN PATENT DOCUMENTS

CN   111243729 A   6/2020

OTHER PUBLICATIONS

Bar, Yaniv et al., "Chest pathology detection using deep learning with non-medical training", 2015 IEEE 12th International Symposium on Biomedical Imaging (ISBI), pp. 294-297, Apr. 16-19, 2015, 4 pages.
(Continued)

*Primary Examiner* — Bobbak Safaipour
(74) *Attorney, Agent, or Firm* — Stephen J. Walder, Jr.; Daniel Yeates

(57) ABSTRACT

Mechanisms are provided to improve an output of a trained machine learning (ML) computer model based on label co-occurrence statistics. For a corpus, label vector representations of the knowledge data structures are generated. Co-occurrence scores for each pairing of labels, across the label vector representations, are generated. A vector output of the ML computer model is received and a knowledge driven reasoning (KDR) computer model is configured with threshold(s) and delta value(s) specifying condition(s) of a co-occurrence of a first label in the output with a second label in the plurality of labels which, if present, causes the delta value(s) to be applied to modify a probability value associated with the second label in the output of the ML computer model. The KDR computer model is executed on the output of the ML computer model to modify probability value(s) in the output.

20 Claims, 17 Drawing Sheets

(51) Int. Cl.
    *G06N 20/00* (2019.01)
    *G06T 7/00* (2017.01)
(52) U.S. Cl.
    CPC .. *G06T 7/0012* (2013.01); *G06T 2207/10116* (2013.01); *G06T 2207/20081* (2013.01); *G06T 2207/20084* (2013.01); *G06V 2201/03* (2022.01)
(58) Field of Classification Search
    CPC ......... G06T 7/0012; G06T 2207/10116; G06T 2207/20081; G06T 2207/20084; G06T 2207/20076; G06T 2207/30061; G06V 2201/03; G06V 10/765; G06V 10/82; G06V 2201/10
    See application file for complete search history.

(56) References Cited

U.S. PATENT DOCUMENTS

| | | |
|---|---|---|
| 2013/0226841 A1 | 8/2013 | Syeda-Mahmood et al. |
| 2019/0188848 A1 | 6/2019 | Madani et al. |
| 2019/0192096 A1 | 6/2019 | Wu et al. |
| 2019/0392547 A1* | 12/2019 | Katouzian .............. G06V 20/62 |
| 2020/0012896 A1* | 1/2020 | Yoo ........................ G06V 10/82 |
| 2020/0093455 A1 | 3/2020 | Wang et al. |
| 2020/0160510 A1* | 5/2020 | Lindemer ............. G06F 40/216 |
| 2020/0211692 A1 | 7/2020 | Kalafut et al. |
| 2020/0311861 A1 | 10/2020 | Katouzian et al. |
| 2020/0364509 A1* | 11/2020 | Weinzaepfel ......... G06F 18/214 |
| 2021/0090694 A1 | 3/2021 | Colley et al. |
| 2021/0177522 A1 | 6/2021 | Boddington et al. |
| 2021/0233645 A1 | 7/2021 | Morard et al. |

OTHER PUBLICATIONS

Hashmi, Mohammad F. et al., "Efficient Pneumonia Detection in Chest Xray Images Using Deep Transfer Learning", Diagnostics 2020, 10, 417, Jun. 19, 2020, 23 pages.
Jadhav, Ashutosh et al., "Combining Deep Learning and Knowledge-driven Reasoning for Chest X-Ray Findings Detection", AMIA Annual Symposium Proceedings, pp. 593-601; Symposium Date: Nov. 14-18, 2020, 9 pages. *[Grace Period Disclosure]*.
Jadhav, Ashutosh, "Knowledge-driven Approach to Boost Performance of Solely Image-based Deep Learning Models", SIIM19 (Society for Imaging Informatics in Medicine) Annual Meeting, Denver, Colorado, Jun. 26-28, 2019, 2 pages.
Syeda-Mahmood, Tanveer et al., "Extracting and Learning Fine-Grained Labels from Chest Radiographs", AMIA Annu Symp Proc., pp. 1190-1199; Symposium Date: Nov. 14-18, 2020, 10 pages.
Yao, Li et al., "Learning to Diagnose from Scratch by Exploiting Dependencies Among Labels", Submitted on Oct. 28, 2017 (v1), last revised Feb. 1, 2018 (this version, v2)], https://arxiv.org/abs/1710.10501, 12 pages.
List of IBM Patents or Patent Applications Treated as Related, Nov. 8, 2021, 2 pages.
Abbas, Asim et al., "Meaningful Information Extraction from Unstructured Clinical Documents", Proceedings of the APAN—Research Workshop 2019, Jul. 22-26, 2019, 6 pages.
Boag, William et al., "Baselines for Chest X-Ray Report Generation", Proceedings of Machine Learning Research 116: 126-140, 2020 Machines Learning for Health (ML4H) at NeurIPS 2019, Dec. 8-14, 2019, 15 pages.
Coden, Anni et al., "Spot the drug! An unsupervised pattern matching method to extract drug names from very large clinical corpora", 2012 IEEE Second Conference on Healthcare Informatics, Imaging and Systems Biology, Sep. 27, 2012, 7 pages.
Demner-Fushman, Dina et al., "Preparing a collection of radiology examinations for distribution and retrieval", Journal of American Medical Informatics Association, vol. 23, No. 2, Jul. 2015, 8 pages.

Goff, Daniel J. et al., "Automated Radiology Report Summarization Using an Open-Source Natural Language Processing Pipeline", J Digit Imaging (2018), 31, 185-192, published online Oct. 30, 2017, 8 pages.
Guo, Yufan et al., "Efficient Clinical Concept Extraction in Electronic Medical Records", Proceedings of the Thirty-First AAAI Conference on Artificial Intelligence (AAAI-17), Feb. 4-9, 2017, 2 pages.
Hansell, David M. et al., "Fleischner Society: Glossary of Terms for Thoracic Imaging", Radiology, vol. 246; No. 3, Mar. 2008, 26 pages.
Hassanpour, Saeed et al., "Information extraction from multi-institutional radiology reports", Published in final edited form as Artif Intell Med. Jan. 2016; submitted Artif Intell Med. Author manuscript; available in PMC Jan. 9, 2017, 32 pages.
He, Kaiming et al., "Deep Residual Learning for Image Recognition", CVPR 2016, Conference on Computer Vision and Pattern Recognition, Jun. 26, 2016-Jul. 1, 2016, 9 pages.
He, Kaiming et al., "Identity Mappings in Deep Residual Networks", European Conference on Computer Vision, LNCS, vol. 9908, 2016, submitted version arXiv:1603.05027v3 [cs.CV], Jul. 25, 2016, 15 pages.
Irvin, Jeremy et al., "CheXpert: A Large Chest Radiograph Dataset with Uncertainty Labels and Expert Comparison", arXiv:1901.07031v1 [cs.CV], Jan. 21, 2019, 9 pages.
Johnson, Alistair E. et al., "Mimic-Cxr: A Large Publicly Available Database of Labeled Chest Radiographs", arXiv:1901.07042v1 [cs.CV], Jan. 21, 2019, 6 pages.
Karargyris, Alexandros et al., "Age prediction using a large chest X-ray dataset", SPIE Medical Imaging 2019, Feb. 16-21, 2019, 9 pages.
Karargyris, Alexandros et al., "Boosting the Rule-Out Accuracy of Deep Disease Detection Using Class Weight Modifiers", 2019 IEEE International Symposium on Biomedical Imaging (ISBI), Apr. 8-11, 2019, submitted version arXiv:1906.09354v1 [eess.IV], Jun. 21, 2019, 5 pages.
Kashyap, Satyananda et al., "Artificial Intelligence for Point of Care Radiograph Quality Assessment", SPIE Medical Imaging, 2019, Feb. 2019, 8 pages.
Kashyap, Satyananda et al., "Looking in the Right Place for Anomalies: Explainable Ai Through Automatic Location Learning", 2020 International Symposium on Biomedical Imaging (ISBI), Apr. 3-7, 2020, submitted version arXiv:2008.00363v1 [cs.CV] Aug. 2, 2020, 6 pages.
Katouzian, Amin et al., "Hashing-Based Atlas Ranking and Selection for Multiple-Atlas Segmentation", International Conference on Medical Image Computing and Computer Assisted Intervention (MICCAI 2018), Sep. 16-20, 2018, 9 pages.
Laserson, Jonathan et al., "TextRay: Mining Clinical Reports to Gain a Broad Understanding of Chest X-rays", International Conference on Medical Image Computing and Computer-Assisted Intervention, Sep. 16, 2018, submitted version arXiv:1806:02121v1 [cs.CV], Jun. 6, 2018, 13 pages.
Lin, Tsung-Yi et al., "Feature Pyramid Networks for Object Detection", IEEE Conference on Computer Vision and Pattern Recognition (CVPR), Jul. 21-26, 2017, 9 pages.
Litjens, Geert et al., "A survey on deep learning in medical image analysis", Elsevier, Medical Image Analysis, vol. 42:60-88, Dec. 1, 2017, 29 pages.
Liu, Guanxiong et al., "Clinically Accurate Chest X-Ray Report Generation", Proceedings of the 4th Machine Learning for Healthcare Conference, PMLR, vol. 106, pp. 249-269, Oct. 2019, 20 pages.
McCord, M.C. et al., "Deep parsing in Watson", IBM J. Res. & Dev. vol. 56 No. 3/4 Paper 3, May/Jul. 2012, pp. 3:1-3:15.
Monshi, Maram Mahmoud A. et al., "Deep learning in generating radiology reports: A survey", Artificial Intelligence in Medicine 106 (2020) 10878, May 10, 2020, 13 pages.
Moradi, Mehdi et al., "Bimodal network architectures for automatic generation of image annotation from text", International Conference on Medical Image Computing and Computer Assisted Intervention (MICCAI 2018), Sep. 16-20, 2018, submitted version arXiv:1809.01610v1 [cs.CV], Sep. 5, 2018, 8 pages.

(56) References Cited

OTHER PUBLICATIONS

Nguyen, Long D. et al., "Deep CNNs for microscopic image classification by exploiting tranfer learning and feature concatenation", IEEE International Symposium on Circuits and Systems, May 2018, 6 pages.

Rajpurkar, Pranav et al., "CheXNet: Radiologist-Level Pneumonia Detection on Chest X-Rays with Deep Learning", arXiv:1711.05225v1[cs.CV], Nov. 14, 2017, 7 pages.

Simonyan, Karen et al., "Very Deep Convolutional Networks for Large-Scale Image Recognition", arXiv:1409.1556v1 [cs.CV], Sep. 4, 2014, 10 pages.

Subramanian, Vaishnavi et al., "Automated Detection and Type Classification of Central Venous Catheters in Chest X-rays", International Conference on Medical Image Computing and Computer Assisted Intervention (MICCAI 2019), Oct. 13-17, 2019, submitted version arXiv:1907.01656v3 [eess.IV], Jul. 25, 2019, 9 pages.

Syeda-Mahmood, Tanveer, U.S. Appl. No. 17/061,628, filed Oct. 2, 2020, 86 pages.

Syeda-Mahmood, Tanveer et al., U.S. Appl. No. 17/061,669, filed Oct. 2, 2020, 87 pages.

Syeda-Mahmood, Tanveer et al., "Building a Benchmark Dataset and Classifiers for Sentence-Level Findings in AP Chest X-Rays", 2019 IEEE 16th International Symposium on Biomedical Imaging (ISBI 2019), Apr. 8-11, 2019, 5 pages.

Syeda-Mahmood, Tanveer et al., "Chest X-ray Report Generation through Fine-Grained Label Learning", International Conference on Medical Image Computing and Computer Assisted Intervention (MICCAI 2020), Oct. 4-8, 2020, submitted version arXiv:2007.13831v1 [cs.CV], Jul. 27, 2020, 11 pages. *[Grace Period Disclosure for U.S. Appl. No. 17/061,669 and U.S. Appl. No. 17/061,669]*.

Syeda-Mahmood, Tanveer, "Role of Big Data and Machine Learning in Diagnostic Decision Support in Radiology", Journal of the American College of Radiology, 15(3), Mar. 2018, 8 pages.

Wang, Hongzhi et al., "Atlas Propagation Through Template Selection", International Conference on Medical Image Computing and Computer Assisted Intervention (MICCAI 2018), Sep. 16-20, 2018, 8 pages.

Wang, Xiaosong et al., "ChestX-ray8: Hospital-scale Chest X-ray Database and Benchmarks on Weakly-Supervised Classification and Localization of Common Thorax Diseases", 2017 IEEE Conference on Computer Vision and Pattern Recognition (CVPR), Jul. 2017, 10 pages.

Wong, Ken C. et al., "3D Segmentation with Exponential Logarithmic Loss for Highly Unbalanced Object Sizes", International Conference on Medical Image Computing and Computer Assisted Intervention (MICCAI 2018), Sep. 16-20, 2018, submitted version arXiv:1809.00076v2 [cs.CV], Sep. 24, 2018, 9 pages.

Wong, Ken C. et al., "A Robust Network Architecture to Detect Normal Chest X-Ray Radiographs", 2020 International Symposium on Biomedical Imaging (ISBI), Apr. 3-7, 2020, submitted version arXiv:2004.06147v1 [eess.IV], Apr. 13, 2020, 5 pages.

Wong, Ken C. et al., "SegNAS3D: Network Architecture Search with Derivative-Free Global Optimiazation for 3D Image Segmentation", Medical Image Computing and Computer Assisted Intervention (MICCAI 2019), Oct. 13-17, 2019, submitted version arXiv:1909.05962v1 [eess.IV], Sep. 12, 2019, 9 pages.

Wu, Joy et al., "Automatic Bounding Box Annotation of Chest X-Ray Data for Localization of Abnormalities", 2020 IEEE 17th International Symposium on Biomedical Imaging (ISBI), Apr. 3-7, 2020, 5 pages.

Wu, Joy T. et al., "Comparison of Chest Radiograph Interpretations by Artificial Intelligence Algorithm vs Radiology Residents", JAMA Network Open, Oct. 9, 2020, 14 pages.

Yu, Fisher et al., "Multi-Scale Context Aggregation by Dilated Convolutions", arXiv:1511.07122v1 [cs.CV], Nov. 23, 2015, 9 pages.

Yu, Kaicheng et al., "Statistically-motivated Second-order Pooling", European Conference on Computer Vision (ECCV) 2018, Sep. 8-14, 2018, 17 pages.

* cited by examiner

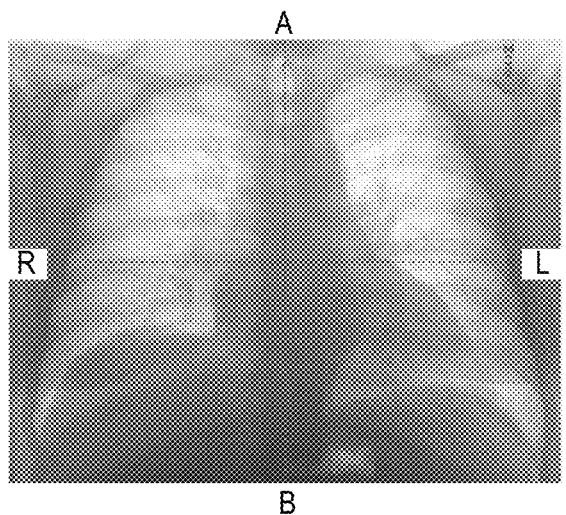
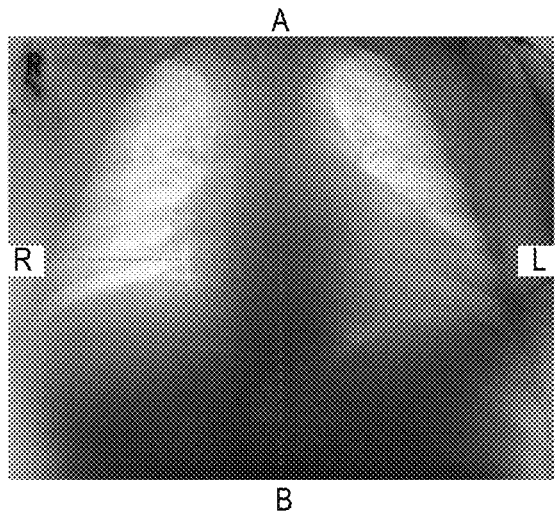

```
Sample Report

Indications:
    Rule out pneumonia and pneumothorax.
    Assess for central line placement.

Findings:
    Patient has been extubated.
    Right IJ line tip at brachiocephalic junction.
    No ptx.
    No change in pleural effusion.
    There is a right basilar air space opacity.

Impression:

Right lower lobe consolidation consistent with pneumonia.
    Consider advancing central line for optimal placement.
```

*FIG. 1C*

| Finding Type | Allowed Modifiers for fine-grained labels |
|---|---|
| Anatomical Finding | Anatomical finding\|present(positive)/absent(negative)\|corefinding\| anatomyaffected\|subanatomy\|location\|laterality\|severity\|size\|hedge\| character\|procedure\|shape\|correlation\|measure\|casue\|symptom |
| Disease | Disease\|present(positive)/absent(negative)\|corefinding\|anatomyaffected\| subanatomy\|location\|laterality\|size\|hedge\|character\|procedure\| shape\|correlation\|measure\|cause\|symptom |
| Devices | Device\|present(positive)/absent(negative)\|corefinding\|anatomyaffected\| subanatomy\|location\|laterality\|severity\|size\|hedge\|character\|procedure\| shape\|correlation\|measure\|cause\|symptom |
| Tubes and Lines | Tubesandlines\|present(positive)\|absent(negative)\|corefinding\| tubesandlines\|subanatomy\|tubesandlineslocation\|laterality\|severity\|size\|hedge\|character\|proce dure\|shape\|correlation\|measure\|cause\|symptom |
| Tubes and Lines Finding | Tubesandlinesfinding\|ill-placed(positive)/well-placed(negative)\| corefinding\|anatomyaffected\|subanatomy\|tubesandlineslocation\| laterality\|severity\|size\|hedge\|character\|procedure\|shape\|correlation\|measure\|cause\|symptom |
| Viewpoint | Views\|positive\|findingname |

FIG. 2

| Signs and symptoms | Acquired abnormality | Anatomical |
|---|---|---|
| Congenital abnormality | Disease or syndrome | Injury or poisoning |
| Neoplastic process | Anatomical structure | Body location |
| Body part, organ, or organ component | Body space or junction | Body system |
| Fully formed anatomical structure | Therapeutic or preventive procedure | Diagnostic procedure |

FIG. 3

| Category | Finding | Category | Finding |
|---|---|---|---|
| Anatomical finding | Azygous Fissure | Anatomical finding | Lobectomy |
| Anatomical finding | Bone lesion | Anatomical finding | Lymph node calcification |
| Anatomical finding | Bullets & foreign bodies | Anatomical finding | Mass/nodule (not otherwise specified) |
| Anatomical finding | Calcified nodule | Device | Cardiac pacer and wires |
| ... | ... | ... | ... |
| Anatomical finding | Fracture | Technical Assessment | Apical lordotic |
| Anatomical finding | Hernia | Technical Assessment | Apices not included |
| ... | ... | ... | ... |
| Anatomical finding | Hydropneumothorax | Tubes and Lines | Central intravascular lines |
| Anatomical finding | Linear/patchy atelectasis | Tubes and Lines Findings | Coiled/kinked/fractured |
| Anatomical finding | Lobar/segmental collapse | Tubes and Lines Findings | Enteric tubes: incorrectly positioned |
| Anatomical finding | Enlarged hilum | Tubes and Lines Findings | Tubes in airway: incorrectly positioned |
| Device | Sternotomy wires | Tubes and Lines | Drain tubes |
| ... | ... | ... | ... |
| Modifiers: | | | |
| Anatomy affected, subanatomy, location laterality, severity, size, hedge, character, procedure, shape, correlation, measure, cause, symptom | | | |

*FIG. 4A*

| Name | codingSystem | categoryIDs | OrganSpecialtyModel.majorstructure | conceptIDs | Concepts | Source | Ontology |
|---|---|---|---|---|---|---|---|
| abdomen | cxr | anatomy | Other soft tissues | .2.297 | abdomen | lexicon | abdomen |
| abdominal | cxr | anatomy | Other soft tissues | .2.297 | abdomen | lexicon | abdomen |
| adrenals | cxr | anatomy | Other soft tissues | .2.297 | abdomen | lexicon | abdomen |
| antral region | cxr | anatomy | Other soft tissues | .2.297 | abdomen | lexicon | abdomen |
| antrum | cxr | anatomy | Other soft tissues | .2.297 | abdomen | lexicon | abdomen |
| ascending colon | cxr | anatomy | Other soft tissues | .2.297 | abdomen | lexicon | abdomen |
| bile ducts | cxr | anatomy | Other soft tissues | .2.297 | abdomen | lexicon | abdomen |
| biliary | cxr | anatomy | Other soft tissues | .2.297 | abdomen | lexicon | abdomen |
| biliary radicals | cxr | anatomy | Other soft tissues | .2.297 | abdomen | lexicon | abdomen |
| bowel | cxr | anatomy | Other soft tissues | .2.297 | abdomen | lexicon | abdomen |
| celiac axis | cxr | anatomy | Other soft tissues | .2.297 | abdomen | lexicon | abdomen |
| colon | cxr | anatomy | Other soft tissues | .2.297 | abdomen | lexicon | abdomen |
| colonic | cxr | anatomy | Other soft tissues | .2.297 | abdomen | lexicon | abdomen |
| ... | ... | ... | ... | ... | ... | ... | ... |

*FIG. 4B*

| Prefix String | Vocabulary Phrase | Matching sentence in a textual report |
|---|---|---|
| Aort:sclero, Aort:sten | Aortic sclerosis, Aortic Stenosis | Marked aortic sclerosis present with evidence of stenosis |
| Frac:clav | Fracture of clavicle | There is a transverse fracture of the mild left clavicle with mild superior angulation of the fracture fragment. |
| Perfor:esop | Perforation of esophagus | A contrast esophagram shows esophageal perforation of the anterior left esophagus at C4-5 with extraluminal contrast seen. |
| Edem:lower:extrem | Edema of lower extremity | EXTREMITIES: Lower extremity trace pitting edema and bilateral lower extremity toe ulceration and onychomycosis, right planar eschar. |
| Atri:dila | Atrial dilatation | Left Atrium: Left atrial size is mildly dilated. |
| Mass:left:brea | Mass in left breast | New lft breast palp mass found. |

*FIG. 5*

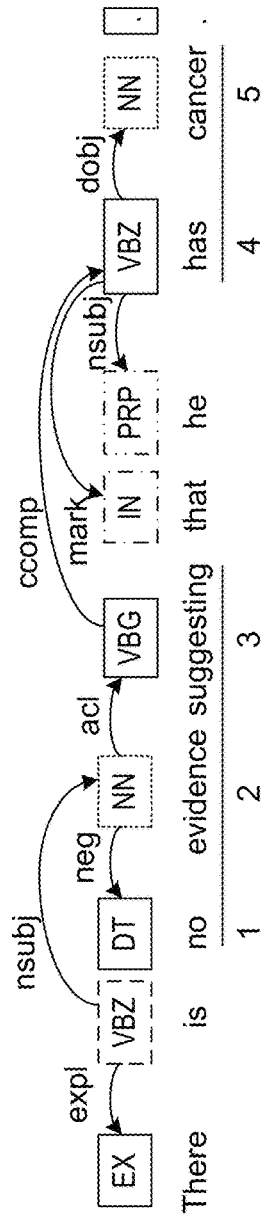

*FIG. 8*

```
findSmallestForm (word)
{
        found = false;
        i = word.length();
        prefix = word;
        while (!found && i>=3)
        {
           prefix = word.substring(0,i);
           if ((prefix not in wordMap) || (prefix not shared in wordMap))
              i--; //continue shrinking
           else
              found = true;
              prefix = word.substring(0, i+1)
        }
        return prefix;
}
```

*FIG. 6A*

```
LCF(S,T);
C[i,0] = 0, C[0,j] = 0, 0≤ i≤K, 0≤j≤N
for (1≤i≤K)
        for(1≤j≤N)
        {
          ρ_ij = |ρ_max(i,j)|/max{|s_i|, |t_j|};
          if C[i-1, j-1] + ρ_ij > C[i-1, j] && C[i-1, j-1] + ρ_ij > C[i, j-1]
                  C[i,j] = C[i-1, j-1] + ρ_ij;
          else
          {
                  If C[i-1, j] + ρ_ij > C[i, j-1]
                          C[i,j] = C[i-1, j] – δ;
                  else
                          C[i,j] = C[i, j-1] – δ;
          }
        }
```

*FIG. 6B*

```
.------------------ ndet        the1(1)              det
.------------------ subj(n)     lung1(2,u)           noun
o------------------ top         be (3,2,5)           verb
| .---------------- vadv        normally1(4,5)       adv
`_+---------------- pred(en)    inflate2(5,u,2,u)    verb
  `---------------- vprep       without1(6,5,7)      prep
    `-------------- objprep(n)  evidence1(7,u,8,u,u) noun
      `------------ nobj(n)     of1(8,7,14)          prep
      | .---------- nadj        focal1(9,u)          adj
      | | .-------- nnoun       airspace1(10,u)      noun
      | | .-------- nnoun       disease1(11,u,u,u)   noun
      | .-+-------- lconj       pleural effusion(211) noun
      | | | .------ nadj        pleural1(12, 13)     adj
      | | `-------- chsl(n)     effusion1(13,u,u)    noun
      `-+---------- objprep(n)  or1(14)              noun
        `---------- rconj       pneumothorax1(15,u)  noun
```

| Sentence | Fine-grained label | Semantics |
|---|---|---|
| There is left base streaky opacity due to xxxx scarring or discoid atelectasis | Anatomicalfinding\|yes discoid atelectasis\|\|\|\|\|\|\|\|\|discoid | Findingtype=anatomical finding<br>Core finding=discoid atelectasis<br>Positive finding? Yes<br>Shape modifier=discoid |
| There is left base streaky opacity due to xxxx scarring or discoid atelectasis | Anatomicalfinding\|yes\|streaky opacity\|base\|\|left\|;;base\|left\|\|\|or\|\|\| streaky | Findingtype=anatomical finding<br>Core finding= streaky opacity<br>Anatomy=base<br>Location=left;base | Laterality=left<br>Character=streaky<br>Positive finding? Yes |
| There is left base streaky opacity due to xxxx scarring or discoid atelectasis | Anatomicalfinding\|yes scarring | Findingtype=anatomical finding<br>Core finding=scarring<br>Positive finding? yes |
| The right upper extremity picc tip is in the upper svc. | Tubesandlinesfinding\|yes upper svc\|\|\|upper svc | Findingtype=position of tubes and lines<br>Isapositive findings? Yes<br>Corefinding=upper svc (happens to be an anatomical structure, this is a case where the core finding is the anatomy itself)<br>Location=upper svc |
| The right upper extremity picc tip is in the upper svc. | Tubesandlines\|yes picc\|extremity upper;,right upper extremity\|\|right right | Findingtype=tubes and lines<br>Positivefinding? Yes<br>Core finding=picc(line) | Subanatomy= right upper extremity tubesandlineslocation=right Laterality=right |

*FIG. 9*

| LABEL | CO-OCCURRED LABELS | CO-OCCURRENCE COUNT |
|---|---|---|
| PLEURAL EFFUSION OR THICKENING | OPACITY | 53338 |
| | LINEAR/PATCHY ATELECTASIS | 20389 |
| | NOT OTHERWISE SPECIFIED OPACITY (PLEURAL/PARENCHYMAL OPACITY) | 16766 |
| | CONSOLIDATION | 7734 |
| | LOBAR/SEGMENTAL COLLAPSE | 4114 |
| | CHEST TUBE | 2466 |

*FIG. 15A*

| METRIC | VALUES |
|---|---|
| CO-OCCURRENCE FREQUENCY $L_1$ | $\{L_2=0, L_3=4, L_4=3, L_5=2\}$ |
| NORMALIZED CO-OCCURRENCE VALUES FOR $L_1$ | $(L_1,L_2)=0, (L_1,L_3)=1, (L_1,L_4)=0.75,$ AND $(L_1,L_5)=0.50$ |
| | |
| CO-OCCURRENCE FREQUENCY $L_3$ | $\{L_1=4, L_2=0, L_4=2, L_5=1\}$ |
| NORMALIZED CO-OCCURRENCE VALUES FOR $L_3$ | $(L_3,L_1)=1, (L_3,L_2)=0, (L_3,L_4)=0.50,$ AND $(L_3,L_5)=0.25$ |
| | |
| CO-OCCURRENCE FREQUENCY $L_4$ | $\{L_1=3, L_2=0, L_3=2, L_5=1\}$ |
| NORMALIZED CO-OCCURRENCE VALUES FOR $L_4$ | $(L_4,L_1)=1, (L_4,L_2)=0, (L_4,L_3)=0.66,$ AND $(L_4,L_5)=0.33$ |

*FIG. 15B*

| PARAMETER | RANGE | DELTA INCREASE IN EACH ITERATION | ITERATIONS |
|---|---|---|---|
| LABEL CO-OCCURRENCE BOOSTING THRESHOLD | 0.4-1.0 | 0.01 | 60 |
| LABEL CO-OCCURRENCE DISCOUNTING THRESHOLD | 0.0-0.2 | 0.01 | 20 |
| BOOSTING DELTA | 0.01-0.5 | 0.01 | 50 |
| DISCOUNTING DELTA | 0.01-0.5 | 0.01 | 50 |

*FIG. 15C*

| CONFIGURATION | PRECISION | RECALL | F1 SCORE | % IMPROVEMENT OVER BASELINE F1 SCORE |
|---|---|---|---|---|
| BASELINE | 0.7822 | 0.7647 | 0.7733 | - |
| BOOSTING ONLY | 0.7999 | 0.7708 | 0.7850 | 1.51% |
| DISCOUNTING ONLY | 0.8407 | 0.8193 | 0.8298 | 7.30% |
| BOOSTING/ DISCOUNTING | 0.8540 | 0.8335 | 0.8436 | 9.09% |

*FIG. 15D*

COMBINED DEEP LEARNING AND KNOWLEDGE DRIVEN REASONING FOR ARTIFICIAL INTELLIGENCE CLASSIFICATION

STATEMENT REGARDING PRIOR DISCLOSURES BY THE INVENTOR OR A JOINT INVENTOR

The following disclosure(s) are submitted under 35 U.S.C. 102(b)(1)(A):
DISCLOSURE(S): "Combining Deep Learning and Knowledge-driven Reasoning for Chest X-Ray Findings Detection", Ashutosh Jadhav, Ken C. L. Wong, Joy T. Wu, Mehdi Moradi, Tanveer Syeda-Mahmood, AMIA Annual Symposium Proceedings, pp. 593-601; Symposium Date: Nov. 14-18, 2020.

BACKGROUND

The present application relates generally to an improved data processing apparatus and method and more specifically to mechanisms for improving artificial intelligence classification operations by combining deep learning and knowledge driven reasoning.

Artificial intelligence (AI) increasingly utilizes machine learning computer models to model various real-world mechanisms, such as biological mechanisms, physics based mechanisms, business and commercial mechanisms, and the like, typically for classification and/or predictive purposes. Such machine learning (ML) computer models include linear regression models, logistic regression, linear discriminant analysis, decision trees, naïve Bayes, K-nearest neighbors, learning vector quantization, support vector machines, random forest, and deep neural networks.

One type of ML computer model that is often used to perform classification operations is a deep learning (DL) computer model. Deep learning is a subset of machine learning which involves the machine learning training of a neural network that has three or more layers of neurons. Such DL computer models attempt to simulate the behavior of the human brain by allowing DL computer model to learn from large amounts of data. However, such DL computer models operate in a different manner than the human brain and are still quite far from matching the human brain's ability to reason and think.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for modifying an output of a trained machine learning (ML) computer model based on label co-occurrence statistics to provide an improved ML computer model output. The method comprises generating, for each source knowledge data structure in a corpus comprising a plurality of source knowledge data structures, a label vector representation of the source knowledge data structure to thereby generate a plurality of label vector representations. The method further comprises determining co-occurrence scores for each pairing of labels in a plurality of labels, by generating statistical measures of the co-occurrence of labels in the pairings of labels across the plurality of label vector representations, to thereby generate a label co-occurrence data structure. The method also comprises receiving an output of the ML computer model, wherein the output is a vector output specifying probability values associated with labels in the plurality of labels. Moreover, the method comprises configuring a knowledge driven reasoning (KDR) computer model with at least one threshold and at least one delta value. The at least one threshold specifies a condition of a co-occurrence of a first label in the output of the ML computer model with a second label in the plurality of labels which, if present, causes the at least one delta value to be applied to modify a probability value associated with the second label in the output of the ML computer model. In addition, the method comprises executing the KDR computer model on the output of the ML computer model to modify one or more probability values in the output of the ML computer model and generate a modified output of the ML computer model, and outputting the modified output to a downstream computing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 1A and 1B are example diagrams of chest X-rays showing cardiomegaly in a patient, with FIG. 1B being a severe case;

FIG. 1C is an example medical imaging report;

FIG. 2 is a diagram showing differences in modifiers associated with different types of core findings in medical reports;

FIG. 3 is a diagram showing concept categories of UMLS relevant for finding vocabulary generation in accordance with one illustrative embodiment;

FIG. 4A is a diagram illustrating example core finding labels found by a core findings lexicon development computing tool to be sufficient for describing findings in anteroposterior (AP) chest radiographs in accordance with one illustrative embodiment;

FIG. 4B is another diagram illustrating a portion of a core findings lexicon in which the various columns of information for the core findings are shown in accordance with one illustrative embodiment;

FIG. 5 is an example diagram illustrating prefix extraction for terms within a vocabulary phrase to increase specificity of matching in accordance with one illustrative embodiment;

FIG. 6A illustrates an example of a deterministic algorithm that identifies a smallest distinguishable prefix per term in a phrase in accordance with one illustrative embodiment;

FIG. 6B illustrates an example of a longest common subfix (LCF) algorithm in accordance with one illustrative embodiment;

FIG. 8 illustrates an example of negation detection for the sentence "There is no evidence suggesting that he has cancer" in accordance with one illustrative embodiment;

FIG. 9 provides a listing of examples of types of fine-grained finding descriptors or labels extracted from sentences from redacted medical imaging reports in accordance with one illustrative embodiment;

FIG. 15A depicts an example of a portion of a label co-occurrence data structure that may be generated by a statistical correlation engine for an example selected label in accordance with one illustrative embodiment;

FIG. 15B is an example diagram illustrating an example of normalized co-occurrence between labels calculated using a feature scaling normalization formula in accordance with one illustrative embodiment;

FIG. 15C shows a table of an example of the ranges and delta by which these parameters are increased with each iteration in accordance with one illustrative embodiment;

FIG. 15D is an example diagram illustrating performance improvements achieved by applying boosting, discounting, and combined boosting/discounting techniques to DL/ML computer models in accordance with example illustrative embodiments;

DETAILED DESCRIPTION

Figures 7A, 7B:
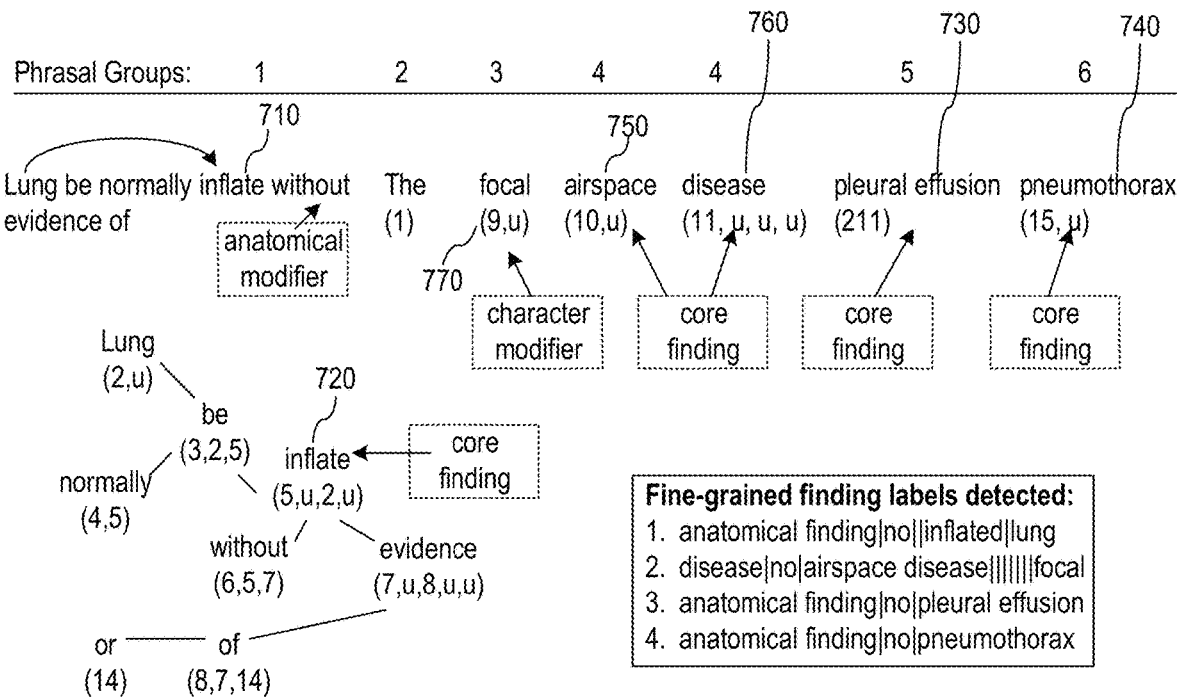
FIG. 7A illustrates a sample Slot Grammar (SG) parse tree for the sentence "The lungs are normally inflated without evidence of focal airspace disease pleural effusion or pneumothorax" in accordance with one illustrative embodiment.
FIG. 7B illustrates a depiction of a phrasal grouping process using a connected component analysis in accordance with an illustrative embodiment.

As mentioned above, deep learning (DL) and machine learning (ML) computer models are being increasingly used to provide artificial intelligence (AI) tools for handling complex operations that are not practically able to be performed in an efficient manner by human beings. Such DL and ML computer models are trained on curated training sets of input data and are tested on curated sets of testing data. Thus, such DL and ML computer models are trained to be good at performing their operations, e.g., classification operations, with regard to data that resembles the training and testing data sets. However, when encountering real world data, the performance of such trained DL and ML computer models may not be as high as achieved during training and testing.

It is recognized that such DL and ML computer models fail to take advantage of the rich knowledge associated with a corpus of knowledge data which can be leveraged to improve the performance of such DL and ML computer models. That is, with many classification operations, there is a repository of knowledge associated with the classification operation that is not taken into account when training and testing the DL or ML computer models. If a mechanism were provided that permitted this knowledge to be used to improve the output generated by the DL or ML computer models, then this would significantly improve the performance of the DL or ML computer models when operating on real world data, i.e., data that is not part of the training or testing datasets used to train the DL/ML computer model.

The illustrative embodiments provide an improved computing tool that leverages knowledge from a corpus of knowledge data to improve the output predictions generated by DL or ML computer models. For example, for a classification operation, the DL or ML computer models may be a multilabel classification DL or ML computer model, hereafter referred to as a "classifier". Such a classifier generates an output vector comprising probability values for each of a plurality of predefined classes, where the probability value indicates a likelihood that the input to the DL/ML computer model is properly classified into the corresponding class represented by that vector slot in the output vector. The class is also referred to as a "label" representing a metadata identifier of what the input data represents.

The illustrative embodiments provide an improved computing tool that includes an automated annotation tool that annotates training data and knowledge data. The annotated training data is used to train the DL/ML computer model while the annotated knowledge data is used to enhance the outputs generated by the trained DL/ML computer model. The illustrative embodiments provide an improved computing tool that further includes a knowledge-driven reasoning tool that leverages knowledge learned from the annotated knowledge data to improve upon the DL/ML computer model performance in generating correct classification outputs, i.e., correct labels. By combining the deep learning or machine learning of the trained DL/ML computer model, and the knowledge from the corpus of knowledge data in a hybrid framework, significant enhancement of overall performance is achieved.

The mechanisms of the illustrative embodiments, as will become apparent to those of ordinary skill in the art in view of the present description, are applicable to any deep learning or machine learning computer models that generate predictive or classification outputs. Such computer models are applicable to various different domains including natural language processing, image recognition, facial recognition, areas of financial prediction/classification, various types of media based prediction/classification, various healthcare prediction/classification operations, and the like. In some illustrative embodiments, the mechanisms of the illustrative embodiments are applied to DL/ML computer models directed to healthcare operations concerning classification operations for medical images, e.g., identifying structures and/or abnormalities present in medical images, such as X-Ray images, magnetic resonance imaging (MM) images, sonogram images, or the like. That is, the DL/ML computer models are trained, via machine learning processes, such as supervised machine learning or unsupervised machine learning, based on annotated (labeled) medical image data to identify patterns within medical image data that are indicative of particular structures and/or abnormalities in the subjects of the medical imaging. The annotated medical image data is processed by the DL/ML computer models which then generate predictions or classifications by calculating probability values for the various predefined classes (labels) of structures/abnormalities. A feedback mechanism is provided along with a loss function to thereby determine an error based on the ground truth of the annotated (labeled) training data which drives modifications to operational parameters of the DL/ML computer model to reduce the loss or error until convergence is reached, which may be no further improvement in loss or error above a predetermined threshold, or a predetermined number of epochs of training have occurred.

With regard to the following description, as an example, the illustrative embodiments will be described with reference to medical image classification DL/ML computer models and improving the output classification probabilities values generated by such DL/ML computer models by leveraging knowledge gathered from a corpus of knowledge data, which in the case of the example embodiments described herein, are the medical imaging report data structures associated with the medical images themselves. That is, the medical imaging report data structures contain knowledge of the findings, e.g., the structures, abnormalities, and/or medical conditions, or lack thereof, that a human subject matter expert (SME), such as a radiologist, identifies from the corresponding medical images, which may comprise a single medical image or a medical imaging study comprising a plurality of medical images. The illustrative embodiments provide mechanisms to identify findings in the medical imaging reports, and specifically cooccurrences of findings in the medical imaging reports, and use that knowledge to modify the probability values of labels corresponding to the cooccurring findings, e.g., if a first finding is found in the medical image(s), then the likelihood that the cooccurring finding is also present is higher. Similar modifications can be made to findings that seldom co-occur. The details of when and how to modify such probability values in outputs of a trained DL/ML computer model will be provided hereafter.

For purposes of illustration, the following description of the illustrative embodiments will focus on an example of a chest X-ray (CXR) medical imaging study as the medical images being evaluated, along with their corresponding medical imaging reports. CXR medical imaging is selected as an example because of the relatively large amount of available medical imaging datasets publicly available, as well as the potential for CXR to diagnose many medical conditions including pleural effusion, pneumonia, infiltration, nodules, atelectasis, pulmonary edema, cardiomegaly, pneumothorax, fractures, and many others. While the illustrative embodiments will focus on CXR medical image classification operations performed by trained DL/ML computer models, the illustrative embodiments are not limited to such. Rather, the mechanisms of the illustrative embodiments may be implemented with any types of medical imaging studies of various portions of a subject's anatomy, as well as different types of subjects, e.g., human, animal, etc., and the like. Moreover, as noted above, the mechanisms of the illustrative embodiments are not limited to medical image classification operations, but can be applied to any domain of classification or prediction performed by trained DL/ML computer models, without departing from the spirit and scope of the present invention.

The illustrative embodiments described herein implement, and make use of, artificial intelligence (AI) and/or cognitive systems (the terms AI and cognitive systems being used interchangeably herein) comprising one or more deep learning or machine learning computer models. The purpose of these AI and/or cognitive systems is to augment, not replace, human intelligence. These AI and/or cognitive systems are designed to enhance and extend human capabilities and potential through specific improved computer tools and improved computer tool operations. These improved computer tools perform operations at a speed, complexity, and volume that is not practically able to be performed by human intelligence. While such AI and/or cognitive systems may emulate achieving similar results to that of human intelligence, they do so using different methodologies and mechanisms specific to computer tools that are not the same as any mental processes or manual efforts of human beings due, at least in part, to the inherent differences in the way that computing devices operate from the way that human minds operate.

The AI and/or cognitive systems implemented by the illustrative embodiments may operate on various types of data, which may include personal or private information of individuals, such as medical images, corresponding medical imaging reports, patient electronic medical records, and the like. While the AI and/or cognitive systems may operate on such personal or private information, the AI and/or cognitive computing systems implement various mechanisms (not specifically shown in the figures) for maintaining the privacy and security of individual's personal or private information and implement a principle of trust and transparency with regard to the security of such personal or private information. This principle of trust and transparency recognizes that any person whose data is tracked and shared should always be given the option to opt-in or opt-out of such tracking and sharing of their personal or private data. This principle of trust and transparency recognizes that a person whose data is tracked and shared should always have control over the use of the data, what entities have access to that data, and the ability to have that data deleted. Moreover, this principle of trust and transparency recognizes that a person's personal or private data should be kept secure from cyber threats and that such data should not be used for purposes, such as government tracking and surveillance, which are not specifically approved by the individual who again, is the ultimate owner of this personal and/or private data.

Thus, where the AI and/or cognitive systems operate on any such personal or private information, these AI and/or cognitive system mechanisms implement functionality for individuals to opt-in or opt-out of usage of their personal/ private data, authorize entities to access their personal/ private data, and provide security mechanisms to ensure that the individual's personal/private data is secure from cyber threats. These mechanisms do not require individuals to relinquish ownership rights in their personal/private data or insights derived from the personal/private data in order to have benefit of the illustrative embodiments. While the illustrative embodiments may promote and utilize free movement of data across one or more data networks which may span organizational and geopolitical borders, such free movement of data is done so using mechanisms that promote security of the personal/private data flows.

Before beginning the discussion of the various aspects of the illustrative embodiments, and the improved computer operations performed by the illustrative embodiments, in greater detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above, the illustrative embodiments are specifically directed to improvements to the functioning of AI and cognitive systems that employ trained DL/ML computer models to perform predictive or classification operations. Moreover, as mentioned above, an example of one such AI or cognitive system and corresponding DL/ML computer models directed to healthcare medical imaging analysis will be provided herein. A healthcare medical imaging analysis example is provided as it is a current area of interest with DL in healthcare covering a broad range of problems ranging from cancer screening and disease monitoring to personalized treatment suggestions. DL-based systems are anticipated to become a significant part of clinical work flows and can assist healthcare providers in predicting diagnosis, prescribing medications, and suggesting treatments and patient management strategies. Applying such DL mechanisms to medical imaging data is increasingly more feasible as computational power, availability of large datasets, and improvements in deep learning computer vision mechanisms are realized.

Currently, however, in the clinical setting, interpretations of medical images are still largely manual processes performed by subject matter experts (SMEs), such as radiologist and those with specialized training. While still being a manual process, the demand for such interpretations is an ever increasing problem, and the sheer number of medical images that SMEs have to analyze can be overwhelming. DL mechanisms can assist such SMEs in sifting through the data and analyzing medical images more efficiently and with less error. In medical imaging, X-rays are the most common imaging exam being conducted in emergency/urgent care facilities. Moreover, recently, several large chest X-ray (CXR) datasets, such as ChestX-ray 14, Chexpert, and MIMIC III, have become available for scientific study.

While DL/ML mechanisms may become more and more attractive to assisting human SMEs in performing operations that are impractical to perform manually due to the sheer volume of data and complexity of data they have to evaluate, as well as the increasing likelihood of errors due to such complexity and voluminous datasets and human limitations, DL/ML mechanisms are still limited in many ways. For example, DL/ML mechanisms do not utilize the rich knowledge associated with connected knowledge bases, e.g., medical imaging reports associated with the medical image data, such as CXR reports associated with chest X-ray imaging studies. For example, DL/ML computer models developed for detection of findings from radiology images such as X-rays do not take into account the statistical correlation between detected findings. CXR reports are a great source of knowledge and by analyzing a collection of such CXR reports, patterns between reported findings may be identified based on their co-occurrences across the CXR report collection. Such knowledge can improve DL/ML computer model performance by recommending missed, as well as overall, findings.

For example consider the scenario in which, by analyzing CXR reports, findings of "pleural effusion" and "opacity" have been found to have a very high probability of co-occurrence across the CXR report collection. If an image based DL/ML computer model, running on the associated CXR medical images only detects "pleural effusion," and misses "opacity", the mechanisms of the illustrative embodiments may boost the predictive score, e.g., probability values, for "opacity" by a delta and turn a missed finding into a detected finding. Similarly, the mechanisms of the illustrative embodiments may improve the DL/ML computer model's performance by utilizing knowledge to decrease the number of false-positive findings, e.g., finding A and finding Z are seldom co-occurring and thus, if DL/ML computer model detects both finding A and finding Z, the predictive score or probability value of finding Z may be reduced by a delta to make a false-positive finding a non-detected finding.

Hereafter, the present specification will reference DL and/or ML computer models, with ML computer models being the broader category of computer models that includes DL computer models and others. It should be appreciated that the mechanisms of the illustrative embodiments are applicable to any machine learning trained computer models or AI computer models that perform a predictive or classification operation and whose output scores, or probability values, may be improved through the mechanisms of the illustrative embodiments as described herein. Moreover, while the following description will provide an example of an improved DL/ML computer model that provides mechanisms for developing a medical imaging findings vocabulary and utilizing that medical imaging findings vocabulary to annotate medical imaging data and medical imaging report data, the illustrative embodiments are not limited to this particular improved DL/ML computer model. To the contrary, this is one example of a DL/ML computer model mechanism with which the mechanisms of the illustrative embodiments may operate and/or with which the mechanisms may be integrated. Other DL/ML computer models may be used without departing from the spirit and scope of the present invention.

In accordance with some illustrative embodiments, the mechanisms of the illustrative embodiments utilize a comprehensive findings vocabulary to automatically annotate an extensive collection of medical images using associated medical imaging reports. The annotated medical images are then used to train a multi-label DL/ML computer model operating to perform a classification operation (hereafter referred to as a "classifier") for medical image finding detection, e.g., CXR finding detection using CXR images and CXR image reports. With the knowledge driven aspects of the illustrative embodiments, the correlation between different medical imaging report specified findings is learned by leveraging the medical imaging reports to compute a statistical correlation between findings. A statistical correlation reasoning computer model modifies the prediction scores from the multi-label classifier based on label correlations and hyperparameter optimization using a grid search in a multi-dimensional space, e.g., four-dimensional space. In so doing, the overall performance of the multi-label classifier is achieved.

As noted above, in some illustrative embodiments, an improved mechanism or using a comprehensive findings vocabulary for automated annotation is implemented as a first primary component for medical image analysis. The following description will provide one example of an improved mechanism for implementing such based on the commonly assigned and co-pending U.S. patent application Ser. No. 17/061,628, entitled "Extracting Fine Grain Labels from Medical Imaging Reports", filed Oct. 2, 2020. It should be appreciated that the mechanisms of these illustrative embodiments build upon this first primary component by providing a second primary component that operates to modify the predictive scores generated by the first primary component, thereby providing a hybrid framework with improved performance. The first primary component will be described with regard to FIGS. 1-13. Thereafter, the additions of the second primary component will be described with regard to FIGS. 14-17 as well as the hybrid framework implementation in a distributed data processing system.

Fine Grained Label Vocabulary Generator and Annotation Mechanism

With regard to the first primary component, it should be appreciated that coarse grained labels for medical images provide little insight into the specific medical conditions of a patient and do not provide the level of detail needed for automated AI systems to provide useful insights. For example, using a coarse grained label of "cardiomegaly" as the label for both the images in FIGS. 1A and 1B is not sufficient to describe these images as one constitutes a severe case (FIG. 1B) and may need more prompt attention and the coarse grained label does not identify any differentiation between such cases. Before AI computing tools for medical image analysis can be incorporated into clinical practices to produce automated preliminary reads of medical imaging studies, the DL/ML computing models of the AI system need to be able to recognize not only a comprehensive and broad spectrum of medical imaging findings, but also describe them in a fine grained fashion, such as covering laterality, anatomical location, severity, appearance characteristics, etc. such that distinctions between different types of the same coarse grain finding can be made apparent to the medical practitioner.

That is, a human generated full-fledged preliminary read radiology report, for example, describes various types of findings along with their positioning, laterality, severity, appearance characteristics, etc., as determined by a human being manually viewing the medical image. FIG. 1C is an example of one type of preliminary read radiology report generated manually. Currently medical image analysis computing tools are unable to provide such full-fledged preliminary reads of medical imaging studies and provide prediction/classification outputs at a same level of specificity as human generated reporting. Thus, while current medical image analysis computing tools provide some assistance to the medical practitioner, they do not have the level of detailed prediction/classification that currently can only be achieved manually.

Thus, to capture realistic read scenarios, deep learning (DL) computer models, i.e., neural network computer models that learn through a machine learning process implemented on large sets of data, should be trained on fine-grained finding labels, where a "fine grained label" is distinguished from the "coarse grained labels" in that the fine-grained finding labels are able to differentiate different types or sub-types of findings associated with coarse grained labels by providing additional finding characteristics, such as type, positive/negative finding, and various modifiers. For example, as will be discussed hereafter, in the context of the present invention, a fine-grained label, or FFL, may be denoted by the structure $F_i = <T_i | N_i | C_i | M_i^*>$ where $F_i$ is the FFL, $T_i$ is the finding type, $N_i$=yes|no indicates a positive or negative finding (i.e. is present versus absent), $C_i$ is the core finding itself, and $M_i$ are one or more of the possible finding modifiers. A coarse finding label, or CFL may include only the core finding itself without the associated attributes of finding type, positive/negative finding, and modifiers.

A number of recent approaches have attempted to take advantage of the associated medical imaging reports to automatically label the corresponding images. However, they have been limited to a small number of coarse grained core findings. Complete labeling of images for all possible findings, i.e. coarse grained core findings and more fine grained findings differentiating different types of the coarse grained core findings, seen in a specific modality of medical imaging is a challenging problem requiring the development of both vocabularies covering these findings and development of high precision and recall methods for extracting labels from the medical imaging study's associated medical imaging reports which can then be used to label the medical images for review by medical practitioners.

In accordance with a first primary component of some of the illustrative embodiments, an improved automated computer tool and computer tool methodology are provided to automatically extract, through automated computer processes without requiring human intervention, fine-grained finding labels from medical imaging reports. The improved automated computer tool and computer tool methodology provides a comprehensive approach to extracting the fine-grained finding labels from medical imaging reports, e.g., radiology reports, which implements a new descriptor for fine-grained finding labels utilizing valid combinations of findings and their characterization modifiers, i.e. terms that characterize attributes of the findings, e.g., positioning, laterality, severity, appearance characteristics, etc., found in medical imaging reports. The illustrative embodiments further provide a vocabulary-driven concept algorithm for automatically finding these findings and modifiers from natural language content, e.g., sentences, in the medical imaging reports. The vocabulary for these findings and modifiers may be derived from established knowledge sources, such as Unified Medical Language System (UMLS) knowledge graphs, or derived from clinician curated custom lexicons. A phrasal grouping computing tool associates detailed characterization modifiers with the relevant findings in the natural language content. Positive and negative instances of a finding are separated and overall fine-grained finding labels are generated from the medical imaging report. These fine-grained finding labels may then be utilized to train a deep learning computer model, such as for labeling medical images, for example, and automatically generating predictions/classifications for medical imaging studies.

Although the primary illustrative embodiment described herein will be described with regard to generating fine-grained finding labels for training DL computer models to perform fine-grained finding labeling of medical images such that fine-grained findings may be automatically determined and reported from medical image processing by the trained deep learning computer model, the illustrative embodiments are not limited to such. To the contrary, the improved automated computing tool and computing tool methodology of the illustrative embodiments are applicable to other uses where it is important to have a refined understanding of the semantic context in a textual report, such as patient medical condition summary generation, for example. Moreover, being able to extract fine-grained finding label information from clinical reports, and medical imaging reports in particular, can have significant implications for clinical care, such as interpreting affected anatomy from the extracted fine grained finding label information which can trigger the scheduling of an imaging study relating to the anatomy in a downstream clinical workflow alert, using the extracted fine grained finding label identification to automatically set up reminders for appointments and trigger additional billing procedures based on the severity of the condition, etc.

Moreover, as chest radiographs, such as those shown in FIGS. 1A and 1B, are the most common diagnostic exam in emergency rooms and intensive care units today, these chest radiographs will be the example basis for explaining the improvements provided by the automated computer tool mechanisms of the illustrative embodiments. However, it should be appreciated that these are only provided as examples and the present invention may be implemented with any type of medical imaging technology currently known or later developed, in which textual reports accompany the medical images. For example, the mechanisms of the illustrative embodiments may be implemented with medical imaging studies of various technologies including, but not limited to, radiograph (e.g., X-ray radiography), computed tomography (CT), fluoroscopy, magnetic resonance imaging (MRI), medical ultrasonography or ultrasound, endoscopy, elastography, tactile imaging, thermography, medical photography and nuclear medicine functional imaging techniques, e.g., positron emission tomography (PET), and the like.

The illustrative embodiments provide a new improved automated computing tool and computing tool methodology that extracts fine-grained finding labels (FFLs) for medical images from medical imaging reports to thereby automatically learn FFLs that occur in medical imaging reports such that they can be used to train machine learning or deep learning (ML/DL) computer models that provide specialized computing tools for performing cognitive (artificial intelligence) computing operations, such as medical image labeling, automated preliminary medical imaging report generation, automated patient summary generation, or the like. The automated computing tool methodology will first be described followed by a description of the computing tool architecture. In addition, specific example embodiments of trained ML/DL models that distinguish FFLs for automated medical imaging applications and automated preliminary medical image report generation will be described.

Fine-Grained Finding Descriptor and Core Finding Vocabulary

The mechanisms of the illustrative embodiments utilize a new fine grained finding descriptor data structure to represent findings in a fine-grained manner with not only the core finding identified, but also any finding modifiers and other attributes of the finding, such as type and positivity attributes. For example, in some illustrative embodiments, the fine-grained finding descriptor data structure is defined as $F_i=<T_i|N_i|C_i|M_i^*>$ where $F_i$ is the fine-grained label, $T_i$ is the finding type, $N_i$=yes|no and indicates a positive or ruled-out finding, $C_i$ is the core finding itself, and $M_i$ are one or more of the possible finding modifiers. In this pattern, each modified $M_i$ is at its designated position separated by a|. The finding types in chest X-rays (CXRs), for example, are adequately covered by six major categories namely, anatomical findings, tubes and lines and their placements, external devices, viewpoint-related issues, and implied diseases associated with findings. By analyzing a large set of chest radiology reports, the set of relevant modifiers $M_i$ for each finding type $T_i$ may be determined, and are in fact different for each finding type $T_i$, as shown in FIG. 2.

In some illustrative embodiments, in order to find a list of valid values for the core findings $C_i$ and modifiers $M_i$ for each finding type $T_i$, a semi-automated process may be implemented by a core findings lexicon development tool to perform both a top-down and bottom-up analysis of medical imaging reports and medical imaging terminology used by medical professionals, to arrive at a vocabulary or lexicon for a particular type of medical imaging, e.g., chest radiology images. The clinician-guided processes implement automated computerized natural language processing computer tools and techniques to analyze and extract features from natural language content, to perform comparisons and analysis that facilitate identifying terms or phrases, representing labels of medical image features, that are frequently used to represent medical concepts in medical image reports.

With regard to the top-down analysis, mechanisms are provided to group key visual observation labels, e.g., natural language terms or phrases, that medical imaging professionals use in medical imaging reports, into lexically and semantically meaningful groups. These groupings are then compared to a corpus of best practices literature in order to identify terms/phrases that represent core findings in each of the finding type categories. With regard to the bottom-up analysis, one or more corpora of medical imaging reports, such as may be obtained from various sources including Indiana data hub dataset, a labeled collection created from National Institutes of Health (NIH) supplied data, and the MIMIC-4 reports, are mined to extract frequently occurring n-grams, i.e. n-grams occurring more than a predetermined threshold number of times in the medical reports, that also had a mapping to categories relating the UMLS concept categories, such as those shown in FIG. 3. The frequently occurring n-grams are then queried against a clinical knowledge base providing a large dataset of medical concepts, thereby providing a set of core terms useful or findings vocabulary generation. A core term expansion tool is used to identify various forms of describing a finding (e.g., infiltrate, infiltration) or alternative ways of describing the same finding (e.g., "cardiomegaly", "heart is enlarged", "enlarged cardiac silhouette"), abbreviations, misspellings, and semantical equivalent ways of describing the same medical imaging concepts (synonyms and alternate forms), as well as ontologically related concepts.

In one illustrative embodiment, the process used to derive a list of valid values for core finding labels and modifiers for each finding type is a semi-automatic process that involves a clinician-directed curation process. Specifically, a team of clinicians (e.g., 3 radiologists and 1 internal medicine doctor) used a combination of top-down and bottom-up processes to uncover the list of findings seen in anteroposterior (AP) chest radiographs and recorded them in a chest X-ray lexicon. The clinicians systematically mapped the key visual observations (labels) that radiologists describe in the reports and grouped the labels into lexically and semantically meaningful groups based on their visual appearance similarities. Using a top-down approach, the clinicians iteratively searched through the best practices literature, including Fleishner Society guidelines, consulted several practicing radiologists, and provided a raw list of everyday use terms from their own practices to arrive at a list of core findings in each of the finding type categories. Next, using a bottom-up approach, report collections, derived from a variety of data sources including the Indiana dataset (3000 reports), internally labeled collection created from NIH supplied data (16,000 reports), and the MIMIC-4 reports (over 180,000 reports). Frequently occurring n-grams, where n varied from 1 to 13, were extracted that also had a mapping to meaningful categories related to the UMLS concept categories in FIG. 3. The resulting frequently occurring n-grams were queried against a clinical knowledge database having concepts assembled from reference vocabularies from UMLS, e.g., 70 reference vocabularies. The clinical knowledge database in one illustrative embodiment had over 5.3 million concepts. This gave rise to a set of core terms useful for findings vocabulary generation, e.g., 1500 core terms in the set of core terms. The core term expansion tool then expanded this set of core terms by capturing and relating the various forms of describing findings, alternative ways of saying the same finding, abbreviations, misspellings, synonyms, alternate forms, etc., and ontologically related concepts. Each expansion was reviewed by two radiologists for agreement resulting in a lexicon consisting of unique terms covering a space of multiple core findings and multiple modifier types, where each modifier type may have many different instances, e.g., the severity modifier may have mild, moderate, severe, chronic, acute, etc. instances. For example, as shown in FIG. 4A, in one illustrative embodiment, this lexicon consisted of over 11,000 unique terms covering the space of 78 core findings and 9 modifier types which represents the largest set of core finding labels assembled for chest radiographs to date.

The resulting core findings lexicon or vocabulary developed through an automated or semi-automated process using the core findings lexicon development computing tool provides a catalog of core finding labels along with their variants which can now be used to locate these core findings in medical imaging reports, such as radiology reports, for image labeling purposes. In one illustrative embodiment, the core finding lexicon describes the following columns: (a) the core finding term; (b) its synonyms which include alternate ways of referring to the core finding, visually similar equivalents, and spelling error variants due to spoken word translations; (c) the category of the core finding such as tubes and lines finding, devices, diseases, etc.; (d) the ontological relationship to another higher level term describing a group of core findings, e.g., fracture is an ontological group for core findings such as sternum fracture, spine fracture, etc.; (e) concept ID as an identifier to place the term in the overall lexicon; (f) the anatomical region where the finding occurs; (g) source of vocabulary (UMLS or other), (h) coding system for the concept ID (ICD9, 10 or internal coding called cxr). An example of a portion of a core finding lexicon in accordance with this illustrative embodiment is shown in FIG. 4B.

In accordance with some of the illustrative embodiments of the present invention, this initial core finding lexicon is used as a basis for performing fine-grained label generation. This fine-grained label generation comprises four primary operations performed by corresponding computing tools specifically configured to perform these operations. These four primary operations consist of (a) core finding and modifier detection, (b) phrasal grouping, (c) negation sense detection, and (d) fine-grained finding pattern completion.

Detecting Core Findings in Reports

With regard to detecting core findings in medical imaging reports, the illustrative embodiments use a lexicon or vocabulary driven concept extraction process to identify all occurrences of core findings and/or their synonym variants in sentences within medical imaging reports. The medical imaging reports, e.g., radiology reports, are pre-processed to isolate the sections describing the findings and impression. Often, these are indicated by section headings found in medical imaging reports and thus, the pre-processing can use natural language processing to identify section headings and the terms in such section headings that are indicative of findings or impressions. The lexicon or vocabulary driven extraction process is then executed on the identified sections of the medical imaging reports.

In order to perform the lexicon or vocabulary driven extraction process, the process first builds a vocabulary index data structure in which each synonym of the core finding points to the core finding phrase in the lexicon. This index may be built upon the core findings lexicon or vocabulary developed through the automated or semi-automated process using the core findings lexicon development computing tool discussed previously. This ensures that a match to a core finding phrase can be found through its synonyms using the vocabulary index data structure. To ensure a match to various word forms of the core finding phrases, the core finding terms are pre-processed by retaining essential prefixes of terms within a core findings prefix data structure such that the combined presence of these prefixes points to the actual core finding phrase in the vocabulary (lexicon). For example, in FIG. 5, column 510 lists the prefix strings for the core findings phrases in column 520. Matching sentences in a textual report for each of the prefix strings are shown in column 530.

The set of prefixes that best discriminate a core finding phrase (also referred to as a vocabulary phrase) can be determined by a deterministic algorithm that iteratively shortens each term in a phrase until it fails to be discriminatory in identifying the vocabulary phrase. An example of such a deterministic algorithm that identifies the smallest distinguishable prefix per term in a phrase is shown in FIG. 6A. In FIG. 6B an example of a longest common subfix (LCF) algorithm is provided, as will be discussed hereafter.

In one illustrative embodiment, the core findings lexicon or vocabulary is pre-processed by this smallest prefix building algorithm to record all prefix strings in the vocabulary index. Generation of the prefix strings is part of the preparation to put the lexicon in an index. The prefix generation process reduces the chance of false matches while increasing precision since the prefix generated is relatively unique for the vocabulary term. For detecting the vocabulary phrase, all prefix terms from vocabulary phrases are searched within the portions of natural language content, e.g., sentences, from the relevant sections of medical imaging reports, e.g., the findings and impression sections, and those vocabulary phrases with full matches to the prefixes are retained. This minimizes the false positives in matching the concepts, particularly for multi-term phrases. Once the candidate vocabulary phrases are identified, a detailed match is initiated within the portions of natural language content, e.g., sentences, in which they were found using a dynamic programming algorithm to align the words of candidate vocabulary phrases to the portion of natural language content (hereafter assumed to be sentences, but which can be any multi-term portion of natural language content) using the prefixes. The resulting alignment guarantees the largest number of words of the vocabulary phrase are matched to the largest possible extend in the sentence while still maintaining the word order and allowing missed and spurious words in between.

For example, given a query vocabulary phrase $S=<s_1 s_2 \ldots s_K>$ of K words and a candidate sentence $T=<t_1 t_2 \ldots t_N>$ of N words, a longest common subfix (LCF) is defined as $LCF(S,T)=<p_1 p_2 \ldots p_L>$, where L is the largest subset of words from S that found a partial match in T, and pi is a partial match of a word $s_i \in S$ to a word in T. A word $s_i$ in S is said to partially match a word $t_j$ in T if it shares a maximum length common prefix $p_i$ such that $$\frac{|p_i|}{\max\{|s_i|, |t_j|\}} \geq \tau,$$

where $\tau$ is a threshold such that if the threshold is set to 1.0, the evaluation reduces to a case of finding exact matches to words of S. Aligning to prefixes was selected in order to correspond to the English grammar rules where many word forms of words share common prefixes. This allows for the modeling of word variants, such as "regurgitated", "regurgitating", and "regurgitation", as they all share a sufficiently long prefix "regurgitat." The alignment to prefixes also allows for modeling spelling errors, particularly those that are made in the later portion of a word which will be deemphasized during alignment.

As noted above, an example LCF based algorithm is shown in FIG. 6B. In the depicted LCF based algorithm, $p_{max}(i, j)$ is the longest prefix of the strings $s_i t_j$ and $\delta$ is a mismatch penalty, which controls the separation between matched words and prevents words that are too far apart in a sentence from being associated with the same vocabulary phrase, thus minimizing the effect of incorrect anaphora resolution in a sentence. Using such an LCF based algorithm, a vocabulary phrase S is said to be detected in a sentence T if $$\frac{|LCF(S, T)|}{|S|} \geq \Gamma$$

for a threshold $\Gamma$. The choice of $\tau$ and $\Gamma$ affect precision and recall in matching and can be suitably chosen to meet specified criteria for precision and recall based on a Receiver Operating Characteristic (ROC) curve analysis. It should be noted that the normalization in the previous equation is on the length of the vocabulary phrase and not the sentence allowing matches to be found in long sentences.

Referring again to FIG. 5, the depicted table illustrates examples of prefix extraction for terms within a vocabulary phrase to increase specificity of matching. In FIG. 5, column 520 shows the vocabulary phrases that were recognized from sentences shown in column 530. As can be seen, the LCF based algorithm, such as the one shown in FIG. 6B, is able to spot the occurrence of both "aortic sclerosis" and "aortic stenosis" in the sentence, even though the words "aortic" and "stenosis" are separated by several words in between. Similarly, the vocabulary phrase "left atrial dilatation" was matched to "Left Atrium: Left atrial size is mildly dilated" even without a deep understanding of the linguistic origins of the underlying words.

Associating Modifiers with Relevant Core Findings

The above vocabulary-driven phrasal detection algorithm can be applied to the vocabulary of both core findings and modifiers in the core findings lexicon (vocabulary) to appropriately tag phrases within sentences. The first step in fine-grained finding detection is to detect the core finding itself using the vocabulary-driven concept extraction method. This method also identifies other terms corresponding to modifiers as well, such as anatomy, location, laterality, etc. Again, during lexicon development, both core findings and modifier types, with corresponding modifier instances, are identified through the semi-automated process, which can then be used to identify phrases in natural language content having core findings and modifiers. The subsequent steps perform natural language parsing, phrasal grouping, etc. By "tagging" what is meant is the identifying of the vocabulary terms from the lexicon within the sentence and marking them as such, i.e. marking them as core finding, modifier type, etc.

To generate fine-grained finding labels (FFLs), the modifiers are associated with the relevant core findings. Doing this without full natural language understanding can be difficult. For example, in the sentence "The lungs are normally inflated without evidence of focal airspace disease, pleural effusion or pneumothorax" is the modifier "focal" associated with airspace disease only, or also with pleural effusion and pneumothorax?

The illustrative embodiments use a natural language parser, such as the English Slot Grammar (ESG) parser, for example, which performs word tokenization, sentence segmentation, morpho-lexical analysis, and syntactic analysis to produce a dependency parse tree, which in the ESG parser mechanism is called the Slot Grammar (SG) parse tree. Using ESG and the SG parse tree as an example, in the SG parse tree, each tree node N is centered on a head term, which is surrounded by its left and right modifiers, which are, in turn, tree nodes. Each modifier M of N fills a slot in N. The slot shows the grammatical role of M in N and is indicated by a tuple T=(t1, t2, . . . tk) which means that t1 is a term grammatically related to modifiers t2, . . . tk. Here, an unknown modifier is indicated by the symbol "u". A sample SG parse tree for the sentence "The lungs are normally inflated without evidence of focal airspace disease pleural effusion or pneumothorax" is shown in FIG. 7A. The association tuples are also shown in FIG. 7A, such as for the word "without", the tuple (6,5,7) indicates the word "without" is relating the term "inflate" to "evidence." Associations that logically go together, such as adjectives describing nouns, are already indicated by the ESG parser through numeric codes exceeding 100, such as for the term "pleural effusion" which has the slot structure (211) and is also seen by the pairing (12, 13).

Given such a dependency parse tree G and the tuples $T_G = \langle T_1, T_2, \ldots T_N \rangle$ corresponding to the N tree nodes, where $T_i = (t_1, \ldots t_{ki})$ is the tuple per node, a phrasal group is defined as $P_j = (e_1, e_2, \ldots e_M)$ where $e_j = t_{ik} \in T_j$ is the kth element of a tuple $T_j$ and $\forall_{j=1}^M T_j \cap T_{+1} \neq 0$. In other words, a phrasal group is a connected component formed from the transitive closure of the tuples such that they have at least one element in common. Consider the sentence "Clear lungs without evidence of pneumonia". The natural language parser would produce a dependency parse tree like that shown in Table 1 below. In this case, it can be seen that (1,2,u) for "clear" indicates words 1 and 2 can be grouped together because they already occur in the dependency parse tree and are indicated by the parser. The word "of1" (5,4,6) is similarly indicating that words 4, 5, and 6 belong to a connected component. Now the word "evidence2" (4,2,u) can be used to infer that the words "evidence of pneumonia" can be further grouped with "lung" (which in turn can be grouped with "clear") to form a larger connected component. Thus, the cues inside the dependency parse tree are used to recursively group words or terms into larger and larger connected components. Initially each connected component may be a single word or a few words already in a relationship such as "clear1" (1,2,u), but after the grouping algorithm we get a larger group (1,2,4,5,6) all in one phrasal group or (clear, lung, evidence, of, pneumonia).

TABLE 1

Example dependency parse tree for sentence "Clear lungs without evidence of pneumonia"

| .- nadj | clear1 (1, 2, u) | adj ∈ |
|---|---|---|
| .-+- subj(n) | lung1 (2, u) | noun |
| \| '- nadjp | without2 (3, u) | adv r |
| o--- top | evidence2 (4, 2, u) | verb |
| '--- vprep | of1 (5, 4, 6) | prep |
| '- objprep(n) | pneumonia (6, u, u) | noun |

FIGS. 7A and 7B illustrate another example of the phrasal grouping process and the groups produced for the sentence shown at the top of the figure. FIG. 7A shows a dependency parse tree of the sentence "The lungs are normally inflated without evidence of focal airspace disease pleural effusion or pneumothorax" generated by an ESG parser. FIG. 7B is a depiction of a phrasal grouping process in accordance with the illustrative embodiments, using a connected component analysis. In FIG. 7B, the core findings from the core findings lexicon that occur within phrasal groups are identified as elements 710-740. Core findings that cross phrasal groups are identified as elements 750-760. The modifier is indicated as element 770. The term "Lung" in the depicted example is another indicated modifier 780 of a "anatomy" type.

Since the core findings and modifiers were detected from a prior stage of processing, i.e. the first stage of the fine-grained finding labels where detection of the vocabulary terms of the lexicon, including terms corresponding to core findings and terms corresponding to modifier types, within the natural language content, these core findings and modifiers are mapped back into the phrasal group by identifying phrasal groups that contain core findings and/or modifiers of core findings in the core findings lexicon or vocabulary. Phrasal groups that contain one or more core findings are called "core phrasal groups" or "core groups" while the rest of the groups are called the "helper phrasal groups" or "helper groups". In the depicted example, phrasal groups 1, 4, 5, and 6 are core phrasal groups whereas the other groupings are helper groups. If a core finding is detected across two or more adjacent core groups, where adjacent core groups are groups in the parse tree that have an edge that directly connects the two groups such that adjacency is based on the nearest consecutive words in the groups, then they are also merged to form a single core group as shown in FIG. 7B where the original phrasal groups for "airspace" and "disease" are combined to generate grouping 4. All modifiers present in helper groups are associated with the core findings of their adjacent groups. Thus, in FIG. 7B, the modifier "focal" in helper group 3 is associated with the core findings of the adjacent core group 4, i.e. "airspace disease". FIG. 7B also lists the various phrasal groups and the two core finding associations found in the sentence (shown as arcs).

Negated Instance Detection of Core Findings

To determine if a core finding is a positive or negative finding (e.g., "no pneumothorax"), such that the correct value for a corresponding positivity characteristic in the fine-grained label descriptor data structure may be set, a two-step process is followed that combines language structuring and vocabulary-based negation detection. The language structuring approach to negation detection starts from a dependency parse tree of a sentence. A set of known negation dependency patterns, such as may be developed by computerized natural language processing (NLP) mechanism developers, is used to search for negation keywords and the scope of words spanned by a negation keyword. The negation pattern detection algorithm iteratively identifies words within the scope of negation of a detected negation keyword based on dependency parsing and pattern matching of the predetermined negation dependency patterns. For example, let S be the set of negated words. The algorithm starts by adding a collection of manually curated negation keywords or cues (e.g., "no") into S, and then iteratively expanding S through traversing the dependency parse tree of a sentence until S becomes stable, i.e. no more words/terms are added to the set of negated words S.

FIG. 8 shows an example of negation detection for the sentence "There is no evidence suggesting that he has cancer." Based on the computerized natural language processing of the natural language content, e.g., the sentence shown in FIG. 8, and the negation pattern matching, the negation scope, i.e. the set of negated words S, is determined to be "evidence", "suggesting", "has", and "cancer", and the target vocabulary phrase is identified as "cancer."

The above described negation detection algorithm is dependent on the correctness of the dependency parse tree data structure. To ensure that the negation keywords, are being associated with the relevant core phrasal group, a vocabulary of "negation prior" and "negation post" terms is developed and utilized such that their occurrence prior or post the core finding in the natural language content is a further indication of negation or avoiding spurious negation detection. This negation prior and negation post evaluation may be performed after the language analysis of the negation detection algorithm operates on the parse tree data structure to identify patterns of negation. By explicitly looking for these negation terms indicating pre or post terms surrounding a core finding, the negation detection can have improved precision. That is, the natural language processing of the negation detection algorithm that identifies patterns within the dependency parse tree uses the dependency parse tree but does not explicitly account for the fact that it is the core finding whose negated instance that is trying to be detected. The use of the pre and post negation terms reduced the negation detection error, such as from approximately 7% to approximately 2%. The pre- and post-negation terms may be documented in the core finding lexicon. By adding the pre- and post-negation term detection mechanism to the negation detection algorithm, based on the pre and post negation terms in the core finding lexicon, performance of the negation detector was found to be improved by a significant amount.

Fine-Grained Finding Descriptor Formation

Through the above processes, core findings in portions of natural language content of medical imaging reports are identified and the phrasal groups associated with core findings are further identified so as to identify which modifiers are associated with the core findings. Whether or not a core finding is positively or negatively identified in these portions of natural language content is further determined using the extended negation detection algorithm described previously which includes both negation pattern detection and pre- and post-negation term occurrence identification. These identified characteristics of a core finding in medical imaging reports are then combined to form a fine-grained finding descriptor data structure that identifies a fine-grained finding pattern which can be used to identify similar occurrences of the fine-grained finding pattern in other medical imaging reports.

To form the fine-grained finding descriptor data structure, using the fine-grained finding descriptor format previously described above, i.e., the tuple defined as $F_i = <T_i | N_i | C_i | M_i^*>$, the fine-grained finding descriptor formation process begins with the core finding Ci and the associated modifiers Mi discovered during the phrasal grouping process discussed above. For each core finding Ci, its finding type is retrieved from the core findings lexicon or vocabulary. Further, due to the a priori knowledge captured in the core findings lexicon or vocabulary for the associated anatomical locations of findings, the fine-grained findings descriptor can be augmented with the anatomical location even when these are not specified in the natural language content of the medical imaging report itself. In addition, the name of the core finding may be ontologically rolled-up to the core findings from the core finding lexicon. That is, in the core finding lexicon, the core finding name and all of its synonyms are specified. In addition, the fine-grained finding name may be rolled-up into the core finding name. For example, if sternum fracture was a core finding in the core finding lexicon, the ontology column of the core finding lexicon will include "fracture" while the synonym column may include "sternal fracture", "sternum bone abnormality", etc. (see example in FIG. 4B, as discussed previously).

The results of the extended negation detection algorithm, indicating whether or not the core finding is positively or negatively indicated in the natural language content, and thus, positively or negatively indicated by the fine-grained finding pattern defined by the fine-grained finding descriptor, may be used to set the value of the negation attribute Ni in the fine-grained finding descriptor data structure.

Thus, all of the components of the fine-grained finding descriptor data structure are provided through the processes above and used to generate the fine-grained finding descriptor data structure. This process is repeated for each core finding in each portion of natural language content processed to generate a database of fine-grained finding descriptor data structures that are found in medical imagine reports. The resulting fine-grained finding descriptor data structures may then be filtered so as to only retain a subset of fine-grained finding descriptor data structures that satisfy desired frequency thresholds. That is, a frequency threshold may be predetermined that indicates how many times a fine-grained finding descriptor data structure must be found present in medical imaging reports in order for it to be maintained in a final set of fine-grained finding descriptor data structures of the database, e.g., 100 instances.

The resulting database of fine-grained finding descriptor data structures can then be used to train machine learning computer models, such as deep learning computer models and the like, to find instances of similar fine-grain finding patterns in other natural language content. The detection of the fine-grained finding patterns defined by the fine-grained finding descriptor data structures in other natural language content may be used as a basis for performing other cognitive computing operations, such as medical image labeling, classification operations based on medical image input data, prediction operations based on medical image input data, or the like. For example, rather than training a machine learning computer model, deep learning computing model (neural network), or the like, to perform medical image labeling, such automated computing tools, models, neural networks, or the like, may be trained to perform other types of automated AI or cognitive computing operations, such as patient synopsis generation. With a patient synopsis embodiment, the trained machine learning computer model, deep learning computing model, or other trained computing tool takes patient electronic medical records, which may include medical imaging reports, and summarize the patient's medical condition based on the detection of fine-grained findings in the patient's electronic medical records and medical images. Such a use will present the synopsis to the medical practitioner who can then review the patient's electronic medical record with a focused approach directed to the portions associated with the patient synopsis, e.g., locating the particular medical images that would show the fine grained findings indicated in the patient synopsis, identifying the lab results that would support/refute the fine grained findings, etc.

FIG. 7B lists fine grain finding descriptors, or fine grain finding labels, extracted from the sentence shown in that figure. As can be seen, both positive and negative instances of findings have been extracted by the process of the illustrative embodiments. FIG. 9 provides a listing of examples of types of fine-grained finding descriptors or labels (FFLs) 920 extracted from sentences 910 from redacted medical imaging reports. The semantics column 930 shows the meaning of the FFL pattern shown in corresponding rows of column 920. That is, each FFL pattern in column 920 is of the form $F_i=<T_i|N_i|C_i|M_i^*>$, as described previously. Thus there is a designated position for each modifier type. From the FFL pattern extraction process, a unique FFL pattern is detected in the sentences of the natural language content of the medical imaging reports, described in the above syntax, with the semantics indicated in column 930. A label code, such as L1, may be assigned to the unique FFL pattern to designate other patterns in other natural language content that correspond to the unique FFL and which can be referred to during machine learning.

As can be seen, important details of the finding are adequately captured in the generated fine-grained finding descriptor or label (FFL) 920, despite the redaction such that the mechanisms of the illustrative embodiments may be run on redacted medical imaging reports and yet still generate a sufficiently detailed fine-grained finding descriptor or label to be used to trained machine learning computer models. In one illustrative embodiment, by mining the findings and impression sections of over 220,000 radiology reports, the above process of the illustrative embodiments was able to record all possible fine-grained finding descriptors/labels that could be extracted and then, by retaining only those fine-grained finding descriptors/labels that were found in at least 100 medical imaging reports, a total of 457 fine-grained finding labels were selected. Of these, 78 were the original core labels identified in the core finding lexicon, and the remaining were finer-grained labels with modifiers extracted automatically using the above processes. FIG. 9 provides an example of some fine-grained finding labels extracted from medical imaging reports and retained as part of a fine grained finding descriptor database using the processes of the illustrative embodiments.

Training Machine Learning Computer Models for Image Labeling

Having developed a database of fine-grained finding descriptor data structures, which define fine grained finding labels (FFLs) or descriptors, the database may be used for various downstream artificial intelligence and cognitive computing operations. These artificial intelligence and cognitive computing operations may involve trained machine learning/deep learning models or may involve other computer logic that implements complex analysis and evaluation of data structures for presentation of information otherwise not able to be easily identifiable by human users or to perform computer operations that cannot be practically performed by human beings due to various factors including, but not limited to, the volume of data being evaluated, the complexity of relationships between data that must be evaluated, or the like.

In some illustrative embodiments, the FFLs defined in the fine-grained finding descriptor data structures may be used in downstream computing systems to perform operations such as identifying an highlighting or otherwise accentuating portions of electronic medical records and/or summarizations of electronic medical records that have a matching FFL. This will provide additional focus to medical imaging subject matter experts on portions of complex electronic medical records/summarizations on the most important portions corresponding to findings which may affect a patient's diagnosis, treatment, or other understanding of the health condition of the patient. In such a downstream computing system, a machine learning model may be utilized, or may not be utilized. That is a computerized pattern matching mechanisms may be employed which does not require machine learning to operate, yet provides a complex analysis of electronic medical record content using other computer constructs, such as a rules engine or the like.

However, in other illustrative embodiments, the FFLs of the fine-grained finding descriptor data structures in the database may be implemented to train a machine learning/deep learning (ML/DL) computer model that is able to distinguish between the fine-grained finding labels. As noted above, while the illustrative embodiments may be used to train ML/DL computer models for identifying FFLs in natural language content to facilitate various types of cognitive computing operations, one principle cognitive computing operation for which such a ML/DL computer model may be trained is to perform medical image labeling, i.e., identifying structures, abnormalities, etc. associated with findings in medical images and appropriately labeling them as such. Such learning involves correlating features extracted from medical images with findings found in the natural language content of corresponding medical imaging reports such that the trained ML/DL computer model learns associations and patterns between medical image features and findings specified in the natural language content. Through training of the ML/DL computer model, these associations are learned and can be used to identify similar patterns in other inputs of medical images and/or medical imaging reports. For example, given features, e.g., an image pattern, extracted from a medical image, the trained ML/DL computer model may predict the labels for the extracted features based on the learned associations with FFLs defined by the fine-grained finding descriptor data structures. Similarly, given a medical imaging report, and identifying an instance of natural language content matching a FFL of a fine-grained finding descriptor data structure, the trained ML/DL computer model can predict the location in a medical image of a corresponding structure, abnormality, etc. based on the learned associations of the FFL of the fine-grained finding descriptor data structure with medical image features.

The learning of FFLs from chest radiographic images, for example, is a fine-grained classification problem for which single networks used for computer vision problems may not yield the best performance as large training sets are still difficult to obtain. Concatenating different image dataset pretrained features from different trained ML/DL computer models, e.g., neural networks, can improve classification. Thus, in some illustrative embodiments, pretrained features, such as ImageNet-pretrained features, from different trained ML/DL computer models for computer vision are combined through a feature pyramid network using features across multiple scales. An example of a ML/DL computer model of this type using concatenation of different image dataset pretrained features is shown in FIG. 10.

Figure 10:
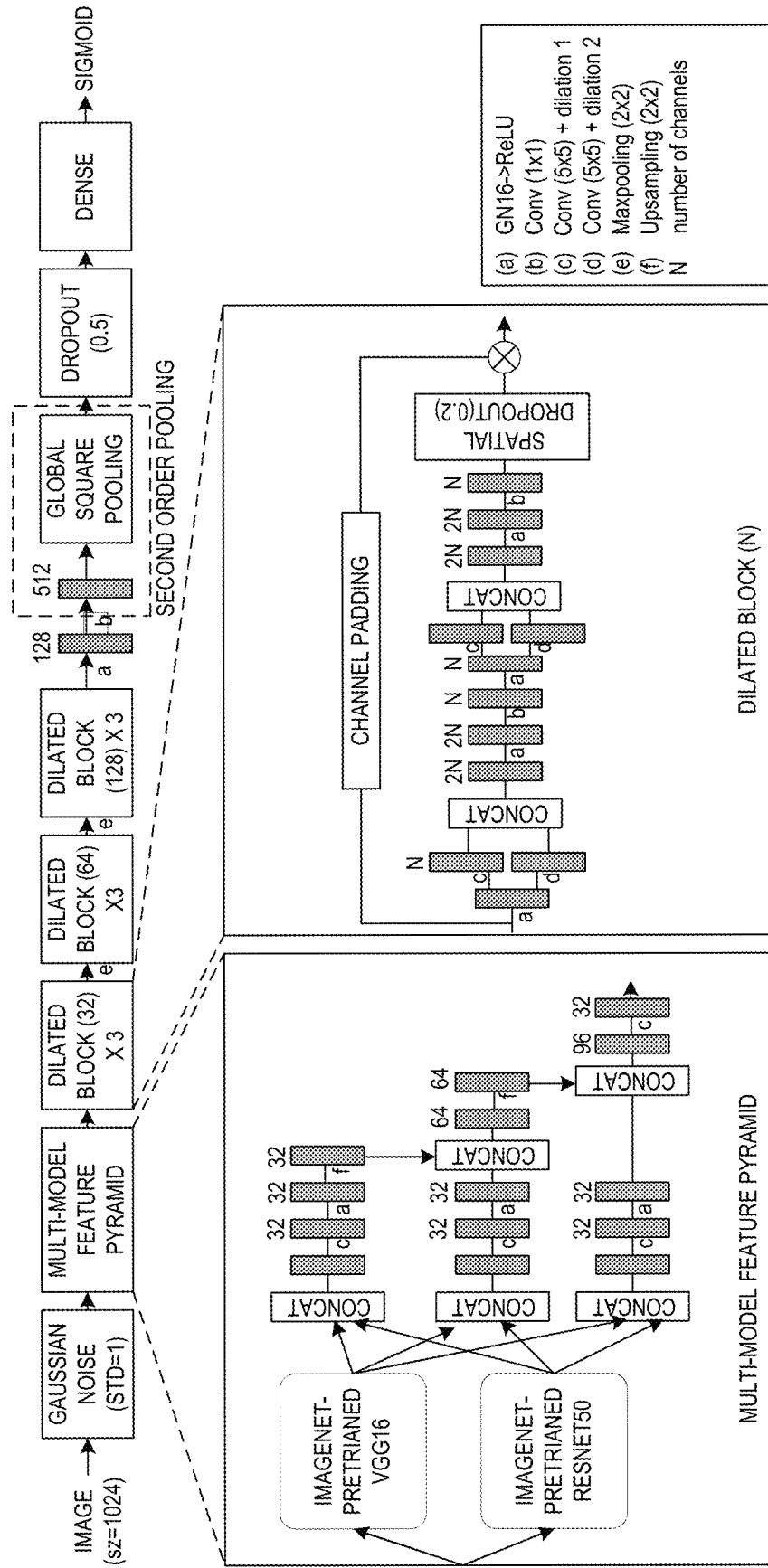
FIG. 10 is an example of a machine learning/deep learning (ML/DL) computer model that may be trained for medical image augmentation (labeling) in accordance with one illustrative embodiment.

For this example embodiment in FIG. 10, the VGGNet and ResNet are used as feature extractors and their lower-level features are retained. In particular, in one illustrative embodiment, from the VGGNet, feature maps with 128, 256, and 512 feature channels are used, which are concatenated with the feature maps from the ResNet of the same spatial sizes which have 256, 512, and 1024 feature channels. Dilated blocks are used to learn the high-level features from the extracted features, e.g., ImageNet features. Each dilated block is composed of dilated convolutions for multi-scale features, and uses a skip connection of identity mapping to improve convergence and spatial dropout to reduce overfitting. Group normalization (e.g., 16 groups) is also used with Rectified Linear Unit (ReLU). Dilated blocks with different feature channels are cascaded with max pooling to learn more abstract features.

Second-order pooling is used, which is proven to be effective for fine-grained classification and maps the features to a higher-dimensional space where they are more separable. In some illustrative embodiments, the second-order pooling is implemented as a 1×1 convolution followed by global square pooling.

Image augmentation with rigid transformations is used to avoid overfitting. As most of an image should be included, in some illustrative embodiments, the augmentation is limited to rotation (+/−10°) and shifting (+/−10°). In one illustrative embodiment, the probability of an image to be transformed is 80% and the optimizer Nadam is used with a learning rate of $2 \times 10^{-6}$, a batch size of 48, and 20 epochs. In some illustrative embodiments, such as in the illustrative embodiments described hereafter with regard to automated imaging report generation, to ensure efficient machine learning, two instances of the ML/DL computer model shown in FIG. 10 are trained, one for core finding labels (CFL labels) and the other for the detailed fine-grained finding labels (FFL labels) which have support of at least a predetermined number of images, e.g., 100 images, for training to exploit the mutually reinforcing nature of the coarse-fine labels. Due to the variability in the size of the dataset per FFL, the Area under the ROC Curve (AUC) per FFL is not always a good indicator for precision on a per image level as it is dominated by the negative examples. To ensure as few irrelevant findings as possible while still detecting critical findings within an image, operating points on a ROC curve per label are selected based on optimizing the F1 score, a well-known measure of accuracy, as $$L(\theta) = -\ln\left(\frac{1}{n}\sum_{i=1}^{n} F1_i(\theta)\right).$$

In one illustrative embodiment, a deep neural network (deep learning model) architecture was designed that combines the advantages of pretrained features with a multi-resolution image analysis through a feature pyramid network for fine grained classification. Specifically VGGNet[21] (16 layers) and ResNet (50 layers) were used as the initial feature extractors, which were trained on multi-million images from ImageNet. Dilated blocks composed of multi-scale features and skip connections were used to improve convergence while spatial dropout was used to reduce overfitting. Group normalization (16 groups) was used, along with Rectified Linear Unit (ReLU) as activation function. Dilated blocks with different feature channels were cascaded with max pooling to learn more abstract features. Bilinear pooling was used for effective fine-grained classification.

To train the deep learning model, the modeling dataset was split into three partitions for training, validation and testing. Since existing methods of random splitting cannot ensure adequate number of images for low incidence label training, the splitting algorithm in this example embodiment sorted the labels by their frequencies of occurrences. The splitting algorithm then iteratively assigned the images from distinct patients to the three partitions in the ratio of 70-10-20% for training, validation and testing. Once the number of patients in each split was determined per label, the assignment of the patients/images was still random. Thus, the algorithm ensured that the prevalence distributions were similar for training, validation and testing partitions while minimizing the selection bias through random sampling of images.

The deep learning model was trained on all finding labels (CFLs and FFLs depending on the model trained). As the images were of high resolution (e.g., 1024×1024), training took approximately 10 days. The Nadam optimizer was used for fast convergence with the learning rate as $2 \times 10^{-6}$. Two NVIDIA Tesla V100 GPUs with 16 GB memory were used for multi-GPU training with a batch size of 12 and 30 epochs.

Computing Environment and Computing Architecture

The illustrative embodiments provide an improved computing tool and improved computing tool methodology to automatically learn fine-grained finding labels (FFLs) used in the natural language content of medical imaging reports and generate fine-grained finding descriptor data structures that define fine-grained finding patterns. The fine-grained finding descriptor data structures can then be used to train machine learning/deep learning (ML/DL) computer models, such as neural networks or the like, to perform artificial intelligence (cognitive computing) operations based on the detection of such fine-grained finding patterns in other natural language content, such as other medical imaging reports, other portions of patient electronic medical records, or the like. In this way, improved automated computing tools are provided to assist human medical practitioners in understanding and identifying findings in a patient's electronic medical records (EMRs), thereby improving the way that the human medical practitioner can perform their duties of providing care to their patients. That is, the improved automated computing tools are able to surface, from the large combination of medical information data of a patient's electronic medical record, the subset of information of particular importance for the medical practitioner's attention corresponding to fine-grained findings. This reduces the likelihood that the medical practitioner will miss information in the patient's EMR, or miss associations of information in the patient's EMR because this information is obscured by the complexity and/or volume of information present in the patient EMR, or the difficulty in identifying specific structures/abnormalities in medical imaging data. The improved computing tools of the illustrative embodiments automatically learn fine-grained finding patterns and automatically uses the learned fine-grained finding patterns to identify instances of such patterns in patient electronic medical records to thereby extract associated information from the patient electronic medical records and perform other artificial intelligence (cognitive computing) based operations to assist medical practitioners, such as automatically labeling structures/abnormalities in medical images, automatically generating preliminary medical imaging reports, automatically generating patient electronic medical record summaries that specify specific subsets of pertinent information extracted from the patient electronic medical record that is of particular importance to medical practitioner review, etc.

Figure 11:
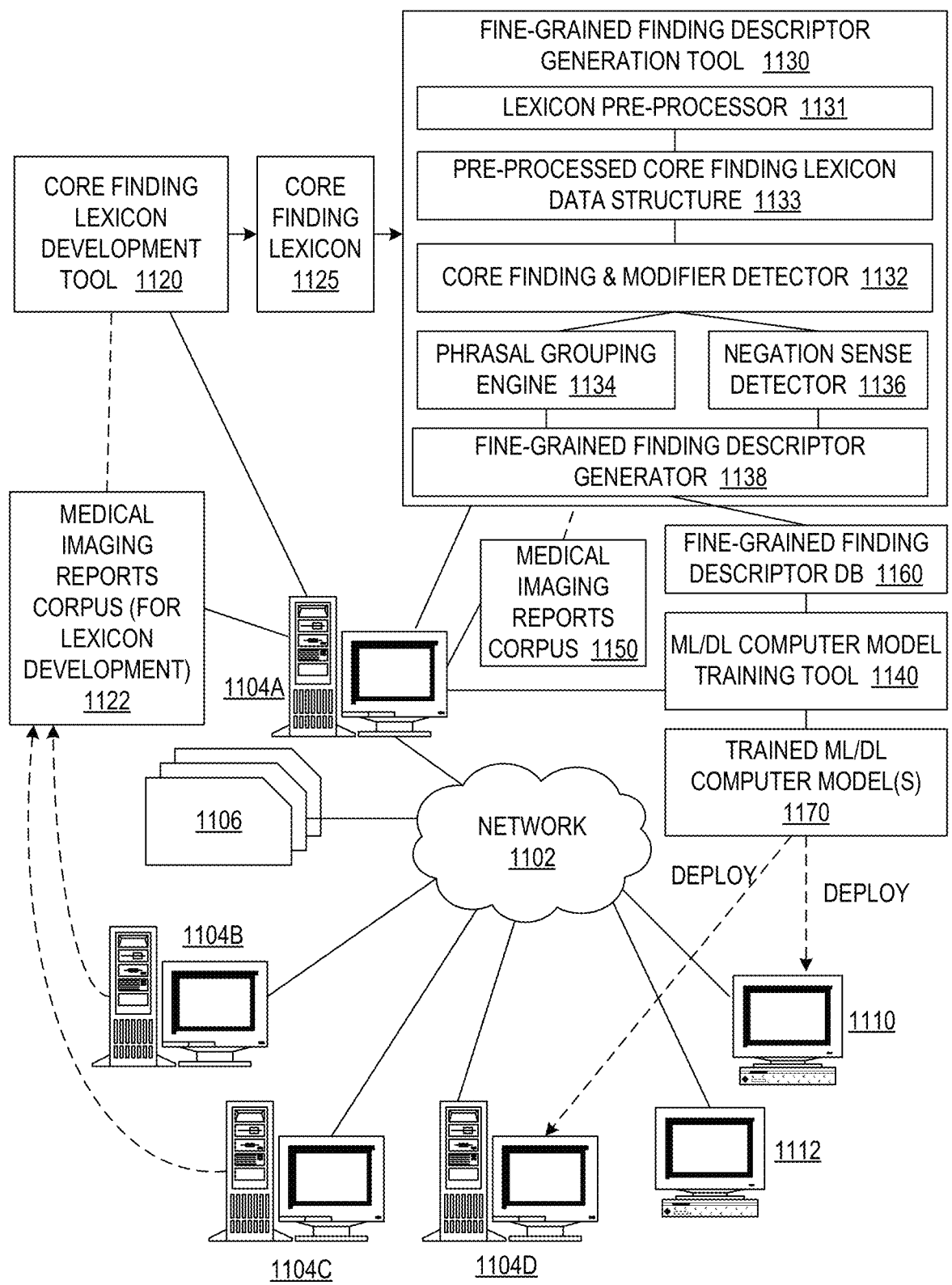
FIG. 11 depicts a pictorial representation of an example distributed data processing system in which aspects of the illustrative embodiments may be implemented.
Figure 12:
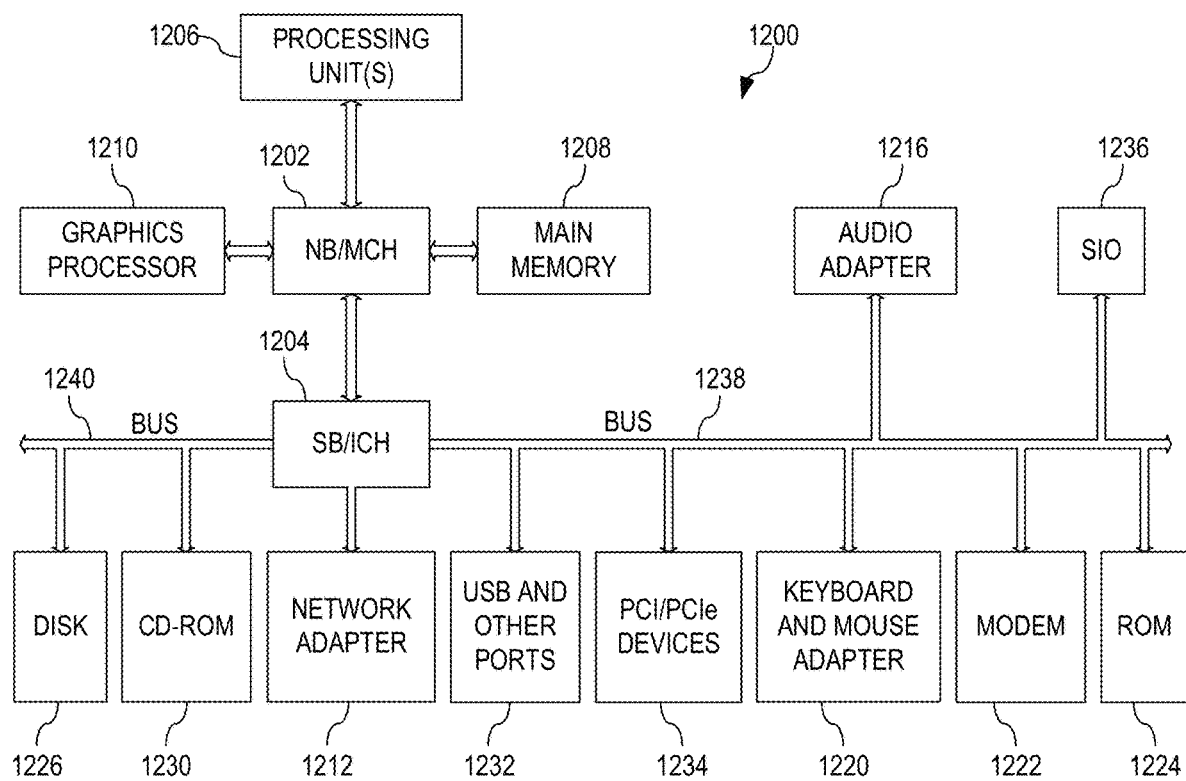
FIG. 12 is a block diagram of one example data processing system in which aspects of the illustrative embodiments may be implemented.

As the present invention is specifically directed to improved automated computing tools and automated computing tool methodologies, it can be appreciated that the illustrative embodiments may be utilized in many different types of data processing environments in which one or more computing devices are specifically configured through software/hardware logic to perform the specific automated computing tool processes previously described above. In order to provide a context for the description of the specific elements and functionality of the illustrative embodiments, FIGS. 11 and 12 are provided hereafter as example environments in which aspects of the illustrative embodiments may be implemented. It should be appreciated that FIGS. 11 and 12 are only examples and are not intended to assert or imply any limitation with regard to the environments in which aspects or embodiments of the present invention may be implemented. Many modifications to the depicted environments may be made without departing from the spirit and scope of the present invention.

FIG. 11 depicts a pictorial representation of an example distributed data processing system in which aspects of the illustrative embodiments may be implemented. Distributed data processing system 1100 may include a network of computers in which aspects of the illustrative embodiments may be implemented. The distributed data processing system 1100 contains at least one network 1102, which is the medium used to provide communication links between various devices and computers connected together within distributed data processing system 1100. The network 1102 may include connections, such as wire, wireless communication links, or fiber optic cables.

In the depicted example, servers 1104A-D are connected to network 1102 along with network attached storage unit 1108. In addition, client computing devices 1110, 1112, and 1114 are also connected to network 1102. These client computing devices 1110, 1112, and 1114 may be, for example, personal computers, network computers, proprietary servers, or the like. In the depicted example, one or more of the servers 1104A-D provides data, such as boot files, operating system images, and/or applications to the client computing devices (clients) 1110, 1112, and 1114. Client computing devices 1110, 1112, and 1114 are clients to servers 1104A-D in the depicted example. Distributed data processing system 1100 may include additional servers, clients, and other devices not shown.

In the depicted example, distributed data processing system 1100 is the Internet with network 1102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 11 is intended as an example, not as an architectural limitation for different embodiments of the present invention, and therefore, the particular elements shown in FIG. 11 should not be considered limiting with regard to the environments in which the illustrative embodiments of the present invention may be implemented.

As shown in FIG. 11, one or more of the computing devices, e.g., server 1104A, may be specifically configured to implement a core finding lexicon development computing tool 1120, a fine-grained finding descriptor generation computing tool 1130, a machine learning/deep learning (ML/DL) computer model training computing tool 1140 in accordance with one or more of the illustrative embodiments described herein. The configuring of the computing device(s) may comprise the providing of application specific hardware, firmware, or the like to facilitate the performance of the operations and generation of the outputs described herein with regard to the illustrative embodiments. The configuring of the computing device(s) may also, or alternatively, comprise the providing of software applications stored in one or more storage devices and loaded into memory of the computing device(s), such as server 1104A, for causing one or more hardware processors of the computing device to execute the software applications that specifically configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments. In this way, the computing device(s) configured to perform the computer specific operations of the present invention are specialized computing devices performing computer operations based on computer specific logical structures in a manner that cannot be practically performed manually or through human mental processes.

That is, it should be appreciated that once the computing device(s) is/are configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates a computer specific automated learning of fine-grained finding labels used in medical imaging reports and the automated training of machine learning/deep learning computer models to perform artificial intelligence (cognitive computing) operations based on the automatically learned fine-grained finding labels.

The core finding lexicon development computing tool 1120 is specifically configured to perform the operations described previously (see the section of the description above entitled "Fine-Grained Finding Descriptor and Core Finding Vocabulary"), either automatically or semi-automatically, to perform core findings and modifier detection. The core finding lexicon development computing tool 1120 may operate automatically or semi-automatically to process a corpus 1122 of medical imaging reports and medical imaging data to identify core findings terms/phrases in these medical and a core set of modifier types, such that these core findings terms/phrases may be used to generate an initial core findings lexicon/vocabulary. In one illustrative embodiment, the core finding lexicon development computing tool identifies all of the instances of core findings in the electronic documents, e.g., medical imaging reports and corresponding medical image data, in the corpus 1122 and presents these core findings to subject matter experts (SMEs) for evaluation as to whether or not the core finding should be maintained as part of the lexicon.

As discussed above, the core finding lexicon development computing tool 1120 uses a vocabulary-driven concept extraction algorithm to spot all occurrences of core concepts and/or their variants, e.g., synonyms, misspellings, alternative forms, etc., in an electronic corpus of electronically stored medical imaging reports. For example, using a chest X-ray embodiment, the vocabulary-driven concept extraction algorithm is used to create a core finding lexicon or vocabular to catalog all possible findings in medical images, such as chest x-rays, for example, which recorded the names, spelling variants, synonyms, etc. for core findings and modifiers by analyzing a large set of electronically stored medical imaging reports, e.g., 200,000 medical imaging reports. The core finding lexicon development computing tool 1120 generates an initial core finding lexicon or vocabulary data structure 1125 that specifies the core findings and their corresponding finding types and initial set of modifier types, and corresponding modifier instances (see FIGS. 4A and 4B). This core finding lexicon data structure 1125 may then be used by the fine-grained finding descriptor generation computing tool 1130 to identify instances of core findings in medical imaging report data structures of a corpus of such medical imaging report data structures, and generate fine-grained finding descriptor data structures based on the identified instances.

The fine-grained finding descriptor generation computing tool 1130 includes a core finding and modifier detector 1132, a phrasal grouping engine 1134, a negation sense detector 1136, and a fine-grained finding descriptor generator 1138. The core finding and modifier detector 1132 uses the core finding lexicon data structure 1125 and a vocabulary-driven concept extraction algorithm to identify occurrences of core concepts and their variants in natural language content of a corpus of medical imaging reports 1150, which may be the same, different, or overlapping corpus of medical imaging reports as the one used for lexicon development 1122. The fine-grained finding descriptor generation computing tool 1130, in some illustrative embodiments, uses a lexicon pre-processor 1131 implementing a smallest prefix building algorithm to pre-process the core finding lexicon (vocabulary) data structure 1125 to ensure high precision. The lexicon pre-processor 1131 uses a dynamic programming algorithm to align the words of candidate vocabulary phrases to portions of natural language content in the medical imaging reports 1150 using the smallest prefixes with the resulting alignment guaranteeing the largest number of words of the vocabulary phrase being matched to the largest possible extent in the portion of natural language content while still maintaining the word order and allowing missed and spurious words in-between, as described previously. In order to ensure high recall, the vocabulary-driven concept extraction algorithm of the core finding and modifier detector 1132 uses a longest common subfix (LCF) algorithm to perform an approximate match to a target vocabulary phrase in the pre-processed core finding lexicon data structure 1133 within a portion of natural language content of a medical imaging report 1150. In this way, phrases in the natural language that are believed to contain core findings and/or modifiers may be identified.

The phrasal grouping engine 1134 uses a natural language processing (NLP) parser, such as an English Slot Grammar (ESG) parser in some illustrative embodiments, to parse the natural language content of a medical imaging report 1150 to generate a dependency parse tree. The phrasal grouping engine 1134 operates on the dependency parse tree to perform connected component clustering based on the placement of terms in the parse tree, e.g., based on a slot grammar placement of the terms. Core findings and modifiers are then identified within each grouping and associated with each other or with adjacent groups, as previously described above. In this way, the phrasal grouping engine 1134 identifies instances of core findings and corresponding modifiers in medical imaging reports which can be used to create the fine-grained finding descriptor data structures.

The negation sense detector 1136 performs the operations described previously for detecting negation of core findings in the natural language content of the medical imaging report. For example, in some illustrative embodiments, a two-step process is utilized that combines language structuring and vocabulary-based negation detection. The language structuring based negation detection starts from the dependency parse tree of the natural language content and looks for known dependency patterns corresponding to negation, as specified in a predefined set of known dependency patterns and using pattern matching to find matching patterns in the given dependency parse tree. In this way, negation keywords are identified in the dependency parse tree and the scope of words encompassed by these negation keywords is identified by the known negation dependency patterns. The negation pattern detection algorithm iteratively identifies words within the scope of negation based on dependency parsing. To ensure that the negation modifiers are being associated with the relevant core phrase, a vocabulary of "negation prior" and "negation post" terms is also used such that detection of their occurrence prior or post the core finding is used as a further indication of negation or avoiding spurious negation detection. Negation detected by the negation sense detector 1136 is used to set a corresponding negation attribute in the fine-grained finding descriptor data structure.

The fine-grained finding descriptor generator 1138 generates the fine-grained finding descriptors corresponding to the instances of core findings and associated modifiers found in the various medical imaging reports of the corpus of medical imaging reports 1150. As discussed previously, the illustrative embodiments utilize a new fine-grained finding descriptor data structure to define fine-grained finding patterns found in natural language content of medical imaging reports. In some illustrative embodiments, this fine-grained finding descriptor takes the form of $F_i=<T_i|N_i|C_i|M_i^*>$ where again $F_i$ is the fine-grained label, $T_i$ is the finding type, $N_i$=yes|no and indicates a positive or ruled-out finding, $C_i$ is the core finding itself, and $M_i$ are one or more of the possible finding modifiers. While this format is used in some of the illustrative embodiment, the illustrative embodiments are not limited to this format. Other forms and formats of descriptor data structures that associate core findings with modifiers of the core findings may be used without departing from the spirit and scope of the present invention.

With the above format of a fine-grained finding descriptor as an example implementation, the attributes, or fields, of the descriptor are populated with the resulting fine-grained finding information obtained through the operation of the other elements 1132-1136 of the fine-grained finding descriptor generation computing tool 1130. That is, the core finding attribute $C_i$ is populated with the core finding from the lexicon 1125 for which a match was found in a medical imaging report of the corpus 1150 by the core finding and modifier detector 1132. Similarly, the core finding type $T_i$ is populated with information present in the lexicon 1125 specified through the lexicon 1125 building process implemented by the core finding lexicon development computing tool 1120, e.g., see first column in FIG. 2 and the category column in FIGS. 4A and 4B. The modifiers $M_i$ are populated by the modifiers discovered through the phrasal grouping operations performed by the phrasal grouping engine 1134.

The negation attribute Ni is populated with a value corresponding to whether or not the core finding was determined, by the negation sense detector 1136, to be negatively indicated by other natural language content in the medical imaging report 1150.

Thus, the fine-grained finding descriptor generator 1138 generates a fine-grained finding descriptor data structure, e.g., $F_i = <T_i|N_i|C_i|M_i^*>$, for each instance of a core finding found in each medical imaging report processed from the corpus 1150. The generated fine-grained finding descriptor data structures may be stored temporally for further evaluation as to whether or not they should be maintained in a fine-grained finding descriptor database 1160 for training ML/DL computer models. The evaluation of whether or not to maintain certain fine-grained finding descriptor data structures may be determined based on various automatically applied criteria applied by the fine-grained finding descriptor generator 1138, and may include SME review in some illustrative embodiments. The automatically applied criteria, for example, may be a frequency of occurrence within the corpus 1150 compared to a predetermined threshold, e.g., 100. That is, the number of instances of the negatively/positively indicated core finding and modifiers specified in the fine-grained finding descriptor data structure being present within the corpus 1150 is calculated from the generated descriptors and the number of instances are compared to the predetermined threshold value. If the number of instances equals or exceeds the threshold, then an instance of the fine-grained finding descriptor data structure is maintained in the database 1160.

Alternatively, the fine-grained finding descriptor generator 1138 may not generate and store a separate instance of the fine-grained finding descriptor data structure for every instances of the same negatively/positively indicated core finding and modifiers. To the contrary, the fine-grained finding descriptor generator 1138 may generate the fine-grained finding descriptor data structure and compare it to previously generated fine-grained finding descriptor data structure to determine if there is already a matching fine-grained finding descriptor that was generated. If there is a matching fine-grained finding descriptor, then a counter associated with the matching fine-grained finding descriptor data structure is incremented. Thus, a single fine-grained finding descriptor data structure is generated for instances of each different fine-grained finding descriptor found in the corpus 1150 with a counter being used to maintain a count of how many instances of that fine-grained finding descriptor were found to be present in the corpus 1150. This counter value may then be used to compare to the predetermined threshold to determine whether to maintain the fine-grained finding descriptor data structure as part of the database 1160 or not.

As a result of the above processes of the fine-grained finding descriptor generation computing tool 1130, a database 1160 of fine-grained finding descriptor data structures is generated. The fine-grained finding descriptors, or fine-grained finding labels (FFLs), represented in these data structures of the database 1160 may be used to train ML/DL computer models for performing various types of artificial intelligence (cognitive computing) computer operations on new input data. That is, the database 1160 may be accessed by the ML/DL computer model training computing tool 1140 in accordance with one or more of the illustrative embodiments described herein, to train a ML/DL computer model for a specific purpose, such that the trained ML/DL computer model 1170 applies its machine learned specialized training to evaluate new data and provide useful results that are not able to be obtained through generic computing operations, such as loads, stores, basic computer mathematical operations, and the like. It should be appreciated that the resulting trained ML/DL computer model 1170 need not be executed on the same computing device or devices on which the ML/DL computer model training computing tool 1140 executes, and in fact the ML/DL computer model training computing tool 1140 may also execute on a different computing device from the core finding lexicon development computing tool 1120 and/or the fine-grained finding descriptor generation computing tool 1130. That is, each of the elements 1120-1170 may in fact be implemented on different computing devices in the computing environment.

In some illustrative embodiments, the ML/DL computer model training computing tool 1140 may train different instances of the ML/DL computer model 1170 which are each separately deployed for runtime execution on the same or different computing devices and/or may train a single ML/DL computer model which is then deployed to the same or different computing devices as separate instances. Furthermore, in some embodiments, the ML/DL computer model training computing tool 1140 may perform training of a ML/DL computer model remotely such that the ML/DL computer model stays on a user's local computing device, but is trained through a machine learning process in which the ML/DL computer model training computing tool 1140 provides the inputs to the ML/DL computer model, receives the outputs from the ML/DL computer model, and adjusts operational parameters of the ML/DL computer model to reduce loss/error in the outputs of the ML/DL computer model.

As mentioned above, the ML/DL computer model may be trained to perform various types of artificial intelligence (cognitive computing) operations. An example of one type of artificial intelligence operation, for which a ML/DL computer model may be trained based on the fine-grained finding descriptors or fine-grained finding labels (FFLs) in the database 1160, is medical image labeling. That is, the ML/DL computer model 1170 may be trained to take, as input, a medical image data structure, perform image analysis on the medical image data structure, such as a pattern recognition operation on the medical image, and label structures, anomalies, and the like, in the medical image with fine-grained finding labels by matching the patterns found in the medical image with corresponding fine-grained finding descriptor data structures in the database 1160. The information in the fine-grained finding descriptor data structures may be used to generate the actual labels that are applied to the patterns in the medical image to thereby generate fine-grained finding labeled medical image data which provides greater insights into the internal medical condition of patients. The resulting fine-grained finding labeled medical image data may be used as a basis for presentation of the medical images along with the fine-grained finding labels pinpointing the structures/anomalies in the medical image and the fine-grained findings corresponding to those structures/anomalies. Again, an example ML/DL computer model for medical image labeling using the database 1160 is shown in FIG. 10 and described above.

With regard to training the ML/DL computer model 1170, as discussed previously, each FFL pattern can be denoted by an label identifier which can be used to perform machine learning training of the ML/DL computer model 1170, where the ML/DL computer model 1170 is given a training image and its corresponding label vector indicating all the FFL patterns present (1 if the image contains a particular FFL pattern and 0 otherwise). The task of the machine learning is to learn a function that maps the extracted image features/patterns to those labels in the label vector such that when similar image features/patterns are detected in non-labeled images, the trained ML/DL computer model 1170 is able to map those features/patterns to predicted FFL patterns and generate probability values or scores indicating the likelihood that the FFL pattern applies to the input non-labeled image.

The trained ML/DL computer model 1170 may also be trained for various other operations, such as patient medical condition synopsis or summary generation, for example. That is, the ML/DL computer model 1170 may be trained using the database 1160 to identify instances of the FFLs defined by the descriptor data structures present in the database 1160 in patient electronic medical records, which may include medical imaging reports as well as other electronically stored medical information from various source computing systems, e.g., pharmacies, doctor offices, hospitals, medical laboratories, medical imaging companies, medical supply stores, etc. This patient medical information data may be compiled from the various source computing systems into one or more electronic medical records that may be processed by the trained ML/DL computer model 1170 or a plurality of trained ML/DL computer models, of which the trained ML/DL computer model 1170 may be one, in order to generate a summary of the relevant patient medical condition information to be presented to a medical practitioner, such as based on a current medical condition of the patient, based on a specific query submitted by the medical practitioner, or the like.

For example, the trained ML/DL computer model 1170 may be trained to classify text in the patient electronic medical record by extracting features from the text and matching them with the core findings and modifiers specified in the FFLs defined by the fine-grained finding descriptor data structures of the database 1160. In this case, there may be a separate class associated with each FFL of each fine-grained finding descriptor data structure and the ML/DL computer model 1170 is trained, through a machine learning process, to evaluate features extracted from the text of the patient electronic medical records and predict whether the pattern of features matches one or more of the FFLs. The fine-grained finding descriptor data structure(s) associated with the classification prediction(s) made by the trained ML/DL computer model 1170 may be used as a basis for composing a natural language description of the findings as an indicator of a medical condition of the patient. For example, the matching portions of text from the patient electronic medical record may be identified and provided as part of the patient summary and the core finding, modifiers, and negation attributes of the fine-grained finding descriptor data structure may be used as a basis for composing a natural language representation of the FFL of the fine-grained finding descriptor data structure. This is just one example of one way in which a patient summary generation AI operation may be implemented by a trained ML/DL computer model 1170 trained using the database 1160 generated by the processes of the illustrative embodiments.

As noted above, the mechanisms of the illustrative embodiments utilize specifically configured computing devices, or data processing systems, to perform the operations for developing a core finding lexicon, generating fine-grained finding descriptors based on the core finding lexicon, and training a ML/DL computer model based on the FFLs defined in the fine-grained finding descriptors. These computing devices, or data processing systems, may comprise various hardware elements which are specifically configured, either through hardware configuration, software configuration, or a combination of hardware and software configuration, to implement one or more of the systems/subsystems described herein. FIG. 12 is a block diagram of just one example data processing system in which aspects of the illustrative embodiments may be implemented. It should be appreciated that while FIG. 12 may resemble other diagrams of data processing systems, the data processing systems and computing devices implementing the illustrative embodiments are not generic computing devices. They are specialized computing devices that are specifically configured to perform the non-generic computer operations realizing the functions and operations described herein in an automated or semi-automated manner. These operations described herein are specific improved computer operations that can only be performed by a specialized data processing system, computing device, or computer tool that is specifically configured to perform these operations which cannot be practically performed within a human mind.

Data processing system 1200 is an example of a computer, such as server 1104 in FIG. 11, in which computer usable code or instructions implementing the processes and aspects of the illustrative embodiments of the present invention may be located and/or executed so as to achieve the operation, output, and external effects of the illustrative embodiments as described herein. In the depicted example, data processing system 1200 employs a hub architecture including north bridge and memory controller hub (NB/MCH) 1202 and south bridge and input/output (I/O) controller hub (SB/ICH) 1204. Processing unit 1206, main memory 1208, and graphics processor 1210 are connected to NB/MCH 202. Graphics processor 1210 may be connected to NB/MCH 1202 through an accelerated graphics port (AGP).

In the depicted example, local area network (LAN) adapter 1212 connects to SB/ICH 1204. Audio adapter 1216, keyboard and mouse adapter 1220, modem 1222, read only memory (ROM) 1224, hard disk drive (HDD) 1226, CD-ROM drive 1230, universal serial bus (USB) ports and other communication ports 1232, and PCI/PCIe devices 1234 connect to SB/ICH 1204 through bus 1238 and bus 1240. PCI/PCIe devices may include, for example, Ethernet adapters, add-in cards, and PC cards for notebook computers. PCI uses a card bus controller, while PCIe does not. ROM 1224 may be, for example, a flash basic input/output system (BIOS).

HDD 1226 and CD-ROM drive 1230 connect to SB/ICH 204 through bus 1240. HDD 1226 and CD-ROM drive 1230 may use, for example, an integrated drive electronics (IDE) or serial advanced technology attachment (SATA) interface. Super I/O (SIO) device 1236 may be connected to SB/ICH 1204.

An operating system runs on processing unit 1206. The operating system coordinates and provides control of various components within the data processing system 1200 in FIG. 12. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 1200.

As a server, data processing system 1200 may be, for example, an IBM eServer™ System P® computer system, Power™ processor based computer system, or the like, running the Advanced Interactive Executive (AIX®) operating system or the LINUX® operating system. Data processing system 1200 may be a symmetric multiprocessor (SMP) system including a plurality of processors in processing unit 1206. Alternatively, a single processor system may be employed.

Instructions for the operating system, the object-oriented programming system, and applications or programs are located on storage devices, such as HDD 1226, and may be loaded into main memory 1208 for execution by processing unit 1206. The processes for illustrative embodiments of the present invention may be performed by processing unit 1206 using computer usable program code, which may be located in a memory such as, for example, main memory 1208, ROM 1224, or in one or more peripheral devices 1226 and 1230, for example.

A bus system, such as bus 1238 or bus 1240 as shown in FIG. 12, may be comprised of one or more buses. Of course, the bus system may be implemented using any type of communication fabric or architecture that provides for a transfer of data between different components or devices attached to the fabric or architecture. A communication unit, such as modem 1222 or network adapter 1212 of FIG. 12, may include one or more devices used to transmit and receive data. A memory may be, for example, main memory 1208, ROM 1224, or a cache such as found in NB/MCH 1202 in FIG. 12.

As mentioned above, in some illustrative embodiments the mechanisms of the illustrative embodiments may be implemented as application specific hardware, firmware, or the like, application software stored in a storage device, such as HDD 1226 and loaded into memory, such as main memory 1208, for executed by one or more hardware processors, such as processing unit 1206, or the like. As such, the computing device shown in FIG. 12 becomes specifically configured to implement the mechanisms of one or more of the illustrative embodiments and specifically configured to perform the operations and generate the outputs described herein with regard one or more of the core finding lexicon development, fine-grained finding descriptor generation, ML/DL computer model training, and automated medical imaging report generation, in accordance with one or more of the illustrative embodiments.

Those of ordinary skill in the art will appreciate that the hardware in FIGS. 11 and 12 may vary depending on the implementation. Other internal hardware or peripheral devices, such as flash memory, equivalent non-volatile memory, or optical disk drives and the like, may be used in addition to or in place of the hardware depicted in FIGS. 11 and 12. Also, the processes of the illustrative embodiments may be applied to a multiprocessor data processing system, other than the SMP system mentioned previously, without departing from the spirit and scope of the present invention.

Moreover, the data processing system 1200 may take the form of any of a number of different data processing systems including client computing devices, server computing devices, a tablet computer, laptop computer, telephone or other communication device, a personal digital assistant (PDA), or the like. In some illustrative examples, data processing system 1200 may be a portable computing device that is configured with flash memory to provide non-volatile memory for storing operating system files and/or user-generated data, for example. Essentially, data processing system 1200 may be any known or later developed data processing system without architectural limitation.

Figure 13:
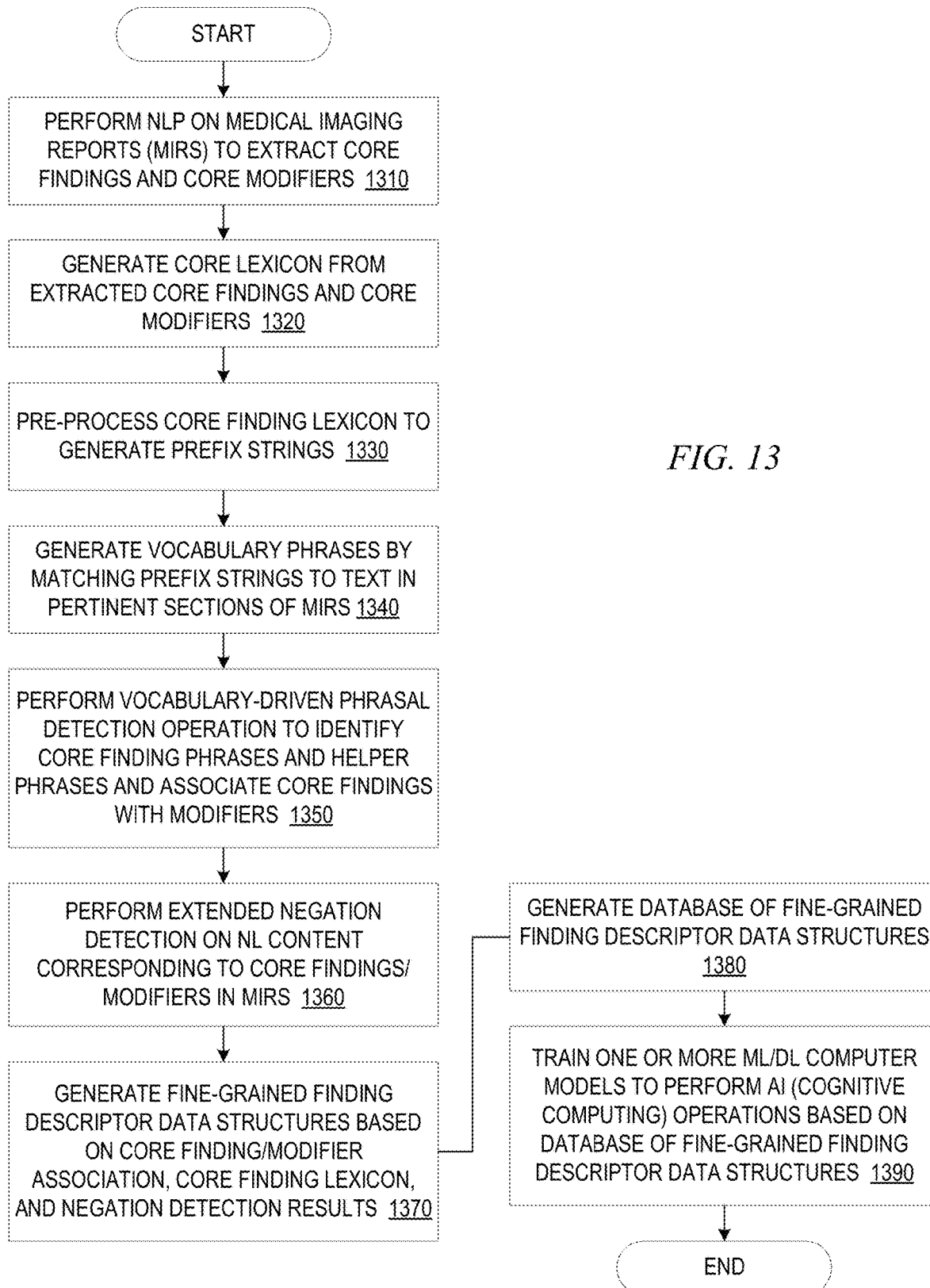
FIG. 13 is a flowchart outlining an example operation for generating fine-grained finding descriptor data structures from medical imaging reports and using those fine-grained finding descriptor data structures to train a machine learning computer model in accordance with one illustrative embodiment.

FIG. 13 is a flowchart outlining an example operation for generating fine-grained finding descriptor data structures from medical imaging reports and using those fine-grained finding descriptor data structures to train a machine learning computer model in accordance with one illustrative embodiment. The operation outlined in FIG. 13 may be performed, for example, by one or more specifically configured computing devices of one or more data processing systems, which are specifically configured to implement the core finding lexicon development computing tool 1120, the fine-grained finding descriptor generation computing tool 1130, and the machine learning/deep learning (ML/DL) computer model training computing tool 1140 in FIG. 11 and their corresponding computing operations to develop a core finding lexicon, use the developed core finding lexicon to generate fine-grained finding descriptors that define fine-grained finding labels (FFLs), and train a ML/DL computer model to perform an AI operation based on the FFLs and their fine-grained finding descriptor data structures.

As shown in FIG. 13, the operation starts by performing natural language processing and computer textual analysis on a first corpus of medical imaging report data structures to extract core findings and core modifiers used in natural language content or text of medical imaging reports (step 1310). The extracted core findings and core modifiers are evaluated through an automated and/or semi-automated process to identify a subset of core findings and core modifiers to be retrained as part of a core finding lexicon or vocabulary (step 1320). The core finding lexicon/vocabulary may include the core finding and core modifiers/modifier types, as well as other information associated with the core findings, such as finding type or the like.

The core finding lexicon/vocabulary is pre-processed using a smallest prefix building algorithm (step 1330) and the prefix strings are used as a basis to search, using a dynamic programming algorithm, such as a longest common subfix (LCF) based algorithm, for instances of the prefix strings in text of relevant sections of medical imaging reports, e.g., the indications and findings sections of medical imaging reports, to generate vocabulary phrases (step 1340). The vocabulary phrases are used as a basis for performing a vocabulary-driven phrasal detection operation that identifies core finding phrases and helper phrases and associates core findings with modifiers based on these detected phrases (step 1350). The modifiers in the illustrative embodiments described herein may be any clinical attribute that is descriptive of the core finding and thus, indicates a fine-grained specific type of the core finding. For example, the modifiers may specify clinical attributes such as laterality, anatomical location, severity, appearance characteristics, and the like.

Extended negation detection, extended by the use of pre- and post-negation term identification operations, is performed on the natural language content or text corresponding the instances of core findings and modifiers found in medical imaging reports through the above operations (step 1360). Based on the results of the association of core findings with modifiers, the core finding lexicon, and the extended negation detection, fine-grained finding descriptor data structures are generated for defining fine-grain descriptors or labels (FFLs) (step 1370). All non-duplicative descriptors, or a subset of the generated fine-grained finding descriptor data structures as determined in accordance with predefined selection criteria, may be maintained in a database for training machine learning/deep learning (ML/DL) computer models (step 1380). Thereafter, the database is used, along with machine learning training logic, to train one or more ML/DL computer models which are then deployed to perform artificial intelligence (cognitive computing) operations, such as medical image analysis, medical image augmentation (or labeling), automated patient summary generation based on patient electronic medical records, or automated medical imaging report generation (described hereafter) (step 1390). The operation then terminates.

Thus, the illustrative embodiments provide mechanisms for computer executed automatic learning of fine-grained finding labels (FFLs) from medical imaging report data structures and automatic generation of descriptor data structures that can be used to train machine learning/deep learning models to identify instances of such FFLs or patterns representative of such FFLs in other textual and/or image input data. This automated improved computing tool provides an improved computing tool methodology that permits a relatively small set of coarse-grained core findings to be used to automatically learn a larger set of fine-grained findings. The fine-grained findings then permit machine learning/deep learning models to be trained to identify much more specific structures/anomalies and provide more detailed information about such specific structures/anomalies. As a result, more focused and accurate information is able to be provided to medical practitioners, which in turn reduces sources of error in treatment of patients.

Leveraging Knowledge Sources and Statistical Correlations to Improve Performance of Trained DL/ML Computer Models The above description of the FFL based training of a DL/ML computer model to perform predictions/classifications with regard to medical images, i.e., automatically generate fine grained findings annotations for medical images, is given as one example of a DL/ML computer model which can be augmented by additional improved computing tool mechanisms of the illustrative embodiments to improve the performance of such DL/ML computer models based on leveraging knowledge sources and statistical correlations. As mentioned previously, the additional improvements provided by these additional improved computing tool mechanisms are applicable to any DL/ML computer models whose predictions/classifications may be improved by taking into account statistical correlations of classifications or prediction classes in available knowledge sources, whether in the medical imaging domain or any of domain in which such DL/ML computer models are implemented. However, to demonstrate the improvements provided, the following description will continue to use the medical imaging domain example illustrative embodiments described previously as an example.

While the application of DL/ML computer models in medical imaging analysis is a steadily growing research area, such DL/ML computer models fail to utilize the rich knowledge associated with connected medical imaging reports. The knowledge derived from these medical imaging reports can be utilized to enhance the performance of DL/ML computer models. In further illustrative embodiments of the present invention, the DL/ML computer model is enhanced by a knowledge driven reasoning engine that uses statistical correlations of labels (output classes), e.g., fine grained or coarse grained findings, in a corpus of knowledge data, such as the medical imaging reports associated with medical image data, to modify the prediction/classification scores generated by the DL/ML computer model for highly correlated or uncorrelated labels (output classes). By boosting the prediction/classification scores for highly correlated labels, potentially missed labels may boosted to a found status. By reducing the prediction/classification scores, potential false positives may be minimized. Thus, the performance of the DL/ML computer model is improved by taking into account statistical correlations in knowledge sources.

As described previously, in some illustrative embodiments, assuming the chest X-ray (CXR) imaging example previously described above, a comprehensive CXR findings vocabulary is used to automatically annotate an extensive collection of CXR medical images using associated medical imaging (e.g., radiology) report data structures and a vocabulary-driven concept annotation computer model. The annotated CXR medical images are then used to train a DL/ML computer model, such as a deep learning neural network classifier, for finding detection, which may include both coarse grained and fine grained findings detection. Examples of these mechanisms have been described above.

In further illustrative embodiments, the resulting DL/ML computer model trained for finding detection is further augmented with a knowledge driven reasoning engine that leverages knowledge learned from the CXR medical imaging report data structures to improve upon the DL computer model's performance on finding detection to thereby combine deep learning and knowledge from knowledge sources, e.g., medical imaging reports, in a hybrid framework which can significantly enhance overall performance of the DL/ML computer model. That is, the knowledge driven reasoning engine operates to boost the performance of the DL/ML computer model, e.g., a deep learning multi-label classifier, using the label (output class) correlation information present in the corresponding knowledge source data structures, e.g., medical imaging reports. For example, in one illustrative embodiment, with a CXR example and the knowledge source data structures being the CXR radiology reports, the knowledge driven reasoning engine uses the correlation between two labels found from a statistical analysis of the radiology reports to adjust the output probabilities of a softmax classifier in such a way that the label correlations are maximized. The update methodology implemented by the knowledge driven reasoning engine iteratively assigns delta increments or reductions of output probabilities until a desired precision and recall are reached. Precision indicates the proportion of true positives to the total positives, i.e., predicted classifications (true positives or TP), that are actually correct (TP/(TP+FP), where FP is False Positive), while recall indicates the proportion of predicted classifications (positives) that were identified correctly ((TP/TP+FN), where FN is False Negative).

As with the mechanisms for training a DL/ML computer model to perform AI operations based on a database of fine-grained finding descriptor data structures described previously, the mechanisms of the further illustrative embodiments implementing the improved computing tool mechanisms of the knowledge driven reasoning engine may be implemented as a specifically configured computing system, a computer program product that specifically configures a computing system to implement the improved computing tool mechanisms, or method performed by the specifically configured computing system implementing the improved computing tool mechanisms. That is, the further illustrative embodiments may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides a knowledge driven reasoning engine that operates to improve the output predictions/classifications of a trained DL/ML computer model based on statistical correlations found in knowledge source data structures. The improved computing tool implements mechanism and functionality, such as a knowledge source pre-processor and knowledge driven reasoning engine, which cannot be practically performed by human beings either outside of, or with the assistance of, a technical environment, such as a mental process or the like. The improved computing tool provides a practical application of the methodology at least in that the improved computing tool is able to perform automated computer analysis of input data to identify annotations or labels of classifications for the input data with increased performance, with regard to precision, recall and F1 score, by leveraging knowledge of statistical measures of co-occurrence of such annotations or labels in knowledge sources, thereby improving the performance of DL/ML computer models.

Figure 14:
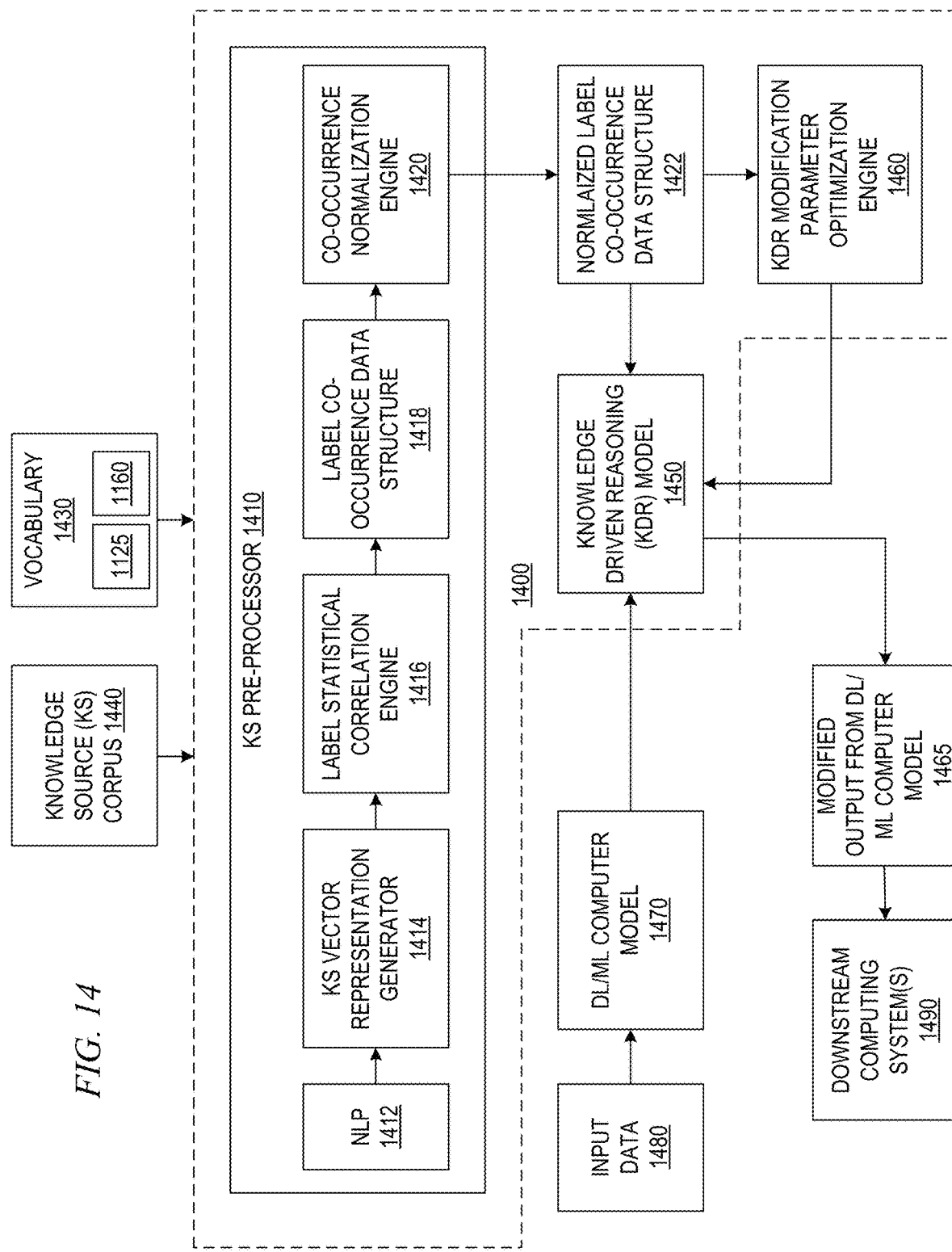
FIG. 14 is an example block diagram of the primary operational components of the knowledge driven reasoning engine in accordance with one illustrative embodiment.

FIG. 14 is an example block diagram of the primary operational components of the knowledge driven reasoning engine in accordance with one illustrative embodiment. The elements shown in FIG. 14 may be implemented, for example, as computer executed logic, either in dedicated hardware, software executed on hardware that configures the hardware to implement the specific elements shown in FIG. 14, or a combination of dedicated hardware and software executed on hardware. It should be appreciated that the elements shown in FIG. 14 operate automatically, without human intervention, once initiated, to perform a knowledge driven reasoning enhancement to the output predictions/classifications generated by a trained DL/ML computer model and thereby provide improved output predictions/classifications for downstream computing systems, such as medical image viewers, automated medical imaging report generation mechanisms, such as described in co-pending U.S. patent application Ser. No. 17/061,628 referenced previously, downstream AI or cognitive computing systems that operate on the output predictions/classifications generated by the DL/ML computer model to perform diagnostic and/or medication/treatment recommendations, or the like.

As shown in FIG. 14, the knowledge driven reasoning engine 1400 includes a knowledge source pre-processor 1410, a knowledge driven reasoning (KDR) model 1450, and a KDR modification parameter optimization engine 1460. The knowledge source pre-processor 1410 includes computerized natural language processing (NLP) engine 1412, a knowledge source (KS) vector representation generator 1414, a label statistical correlation engine 1416 which generates a label co-occurrence data structure 1418, and a co-occurrence normalization engine 1420. The resulting normalized label co-occurrence data structure 1422 is provided to the KDR computer model 1450 which is trained by the KDR modification parameter optimization engine 1460 based on the normalized co-occurrence values in the normalized label co-occurrence data structure 1422 to optimize the applied delta values and thresholds used to determine when to apply the delta values to output predictions/classifications from the DL/ML computer model 1470.

The knowledge source pre-processor 1410 operates on a corpus of knowledge source data structures 1440 which may be, for example, the medical imaging reports corpus 1122 or 1150 in FIG. 11, e.g., the chest X-ray (CXR) radiology reports, stored as electronic textual documents, for CXR imaging studies store as image data. The knowledge source pre-processor 1410 operates on the corpus 1440 based on a predetermined vocabulary data structure 1430 of recognizable terms/phrases corresponding to labels or classifications, such as findings in medical images. This vocabulary data structure 1430 may comprise, for example, the core finding lexicon 1125 and/or fine grained finding descriptor database 1160 in FIG. 11. The vocabulary data structure 1430 is used by the NLP engine 1412 to parse and extract the textual content of the knowledge data structures in the corpus 1440 to identify the findings in the knowledge data structures and map those findings to labels, whether coarse grained or fine grained labels.

Thus, the NLP engine 1412 parses the knowledge source data structures of the corpus 1440 and for each knowledge source maps findings in the textual content to labels. These extracted labels are then provided to the knowledge source vector representation generator 1414 which generates a vector representation of the knowledge source data structure where vector slots correspond to the various labels in the vocabulary 1430. It should be appreciated that a label can be mapped to multiple findings (a one to many mapping) in the vocabulary 1430. Thus, in one illustrative embodiment, the NLP engine 1412 may first identify findings in the knowledge source data structures to thereby generate a findings vector, and this findings vector may be converted, by way of the finding-label mapping specified in the vocabulary 1430, to a label vector representation for the knowledge source data structure. For example, a CXR radiology report may be parsed and processed by the NLP engine 1412 to generate a vector representation of findings identified and extracted from the radiology report. These findings are then mapped to labels based on the vocabulary 1430, which may include a one-to-many mapping for some findings/labels. Since only a subset of the findings are mapped to selected labels and not all radiology reports contain findings related to the selected labels, after this vector transformation, some label vectors may be empty. Because these vector representations are used as a basis for determining co-occurrence of labels in knowledge source data structures (e.g., radiology reports), only the vectors that have at least two labels present in the vector representation will be maintained and other vector representations for other knowledge source data structures will be dropped from further consideration.

This process is performed for a plurality of knowledge source data structures (e.g., radiology reports) in the corpus 1440. The plurality of knowledge source data structures may comprise the entire corpus 1440 or a portion, less than the whole, of the corpus 1440. In so doing, the knowledge source pre-processor 1410 generates a plurality of vector representations for the knowledge source data structures that are provide as input to the statistical correlation engine 1416.

The statistical correlation engine 1416 operates to analyze the vector representations with regard to each label to identify correlations, if any, between each selected label and each other label in the vocabulary 1440. That is, for a selected label from the plurality of labels recognized in the vocabulary 1430, each of the vector representations are scanned to identify vector representations that contain that label and identify which other labels are co-occurring in the vector representation. A count of the number of times the selected label co-occurs with each other label is maintained. For example, if a label set comprises labels A through J, the statistical correlation engine 1416 operates by selecting label A and then processing, or scanning, each of the other vector representations to identify those that contain label A and some other label(s) from the label set, i.e., any of labels B through J. For each co-occurring label in B through J, a corresponding count of how many times that co-occurring label actually co-occurs with label A is maintained. This process is performed once for each pairing of labels in the label set A-J.

FIG. 15A depicts an example of a portion of a label co-occurrence data structure 1418 that may be generated by the statistical correlation engine 1416 for an example selected label. It should be appreciated that the example shown in FIG. 15A is for a single selected label and corresponding entries in the label co-occurrence data structure 1418 may be generated for other selected labels in a similar manner. As shown in FIG. 15A the selected label "pleural effusion or thickening" has been found to co-occur with a plurality of other labels including "opacity," "linear/patchy atelectasis," "consolidation", etc. Each of these co-occurrences has a corresponding co-occurrence count which indicates how many times the selected label co-occurs with the co-occurring label across all of the knowledge source data structures (e.g., radiology reports), as indicated by their vector representations. Thus, for example, in FIG. 15A it is shown that the selected label of "pleural effusion or thickening" co-occurred in radiology reports with the label "opacity" in 53,338 label vector representations and with "linear/patch atelectasis" in 20,389 label vector representations. While a raw count of the co-occurrence is shown as an example statistical measure for determining statistical correlations, the illustrative embodiments are not limited to such and any statistical measure of the co-occurrence of labels may be used without departing from the spirit and scope of the present invention.

The label co-occurrence data structure 1418 generated by the statistical correlation engine 1416 may comprise entries for each pairing of selected labels with co-occurring labels across all of the vector representations of the knowledge source data structures, e.g., entries for each pairing of selected labels across all of the label vector representations of radiology reports in the corpus 1440. The label co-occurrence data structure 1418 is provided to the co-occurrence normalization engine 1420 which operates to compute co-occurrence normalization that rescales the co-occurrence values into a predetermined range, e.g., [0,1]. Using a range of [0,1] as an example, the value "1" represents a highest co-occurrence and "0" represents a least co-occurrence. One example scaling function that may be utilized to perform this normalization may be the feature scaling normalization formula $X_{norm}=(X-X_{min})/(X_{max}-X_{min})$, where X is the original co-occurrence frequency (or count), $X_{norm}$ is the normalized co-occurrence value, and $X_{max}$ and $X_{min}$ are the maximum and minimum co-occurrence frequencies.

It should be noted that the normalized co-occurrence between two labels is a function of the label's co-occurrence frequency with other labels. Thus, two labels (A, B) may have different normalized co-occurrence values for (label A, label B) and (label B, label A). To illustrate this, consider the following example knowledge source data structures, e.g., radiology reports, Doc1-Doc7 represented as label vectors with labels $L_1$-$L_5$:

Doc1: {$L_1$, $L_3$, $L_5$}
Doc2: {$L_1$, $L_3$}
Doc3: {$L_1$, $L_3$, $L_4$}
Doc4: {$L_1$, $L_4$, $L_5$}
Doc5: {$L_1$, $L_4$}
Doc6: {$L_1$, $L_3$}
Doc7: {$L_3$, $L_4$}

Calculating the normalized co-occurrence between labels using the feature scaling normalization formula above, one obtains the values in FIG. 15B. In this example, normalized co-occurrence values for $L_1$ and $L_3$ are the same, i.e., ($L_1$, $L_3$)=($L_3$, $L_1$), while for $L_3$ and $L_4$ they are different, i.e., ($L_3$, $L_4$)≠($L_4$, $L_3$).

This process of generating normalized co-occurrence values is performed for each of the label pairs in the label set of the vocabulary 1430 using the vector representations of the knowledge source data structures from the corpus 1440 generated by the vector representation generator 1414. The resulting normalized label co-occurrence data structure 1422 is provided to the knowledge driven reasoning (KDR) computer model 1450 and the KDR modification parameter optimization engine 1460. The KDR computer model 1450 operates on output predictions/classifications from the trained DL/ML computer model 1470, which in some illustrative embodiments may be the trained DL/ML computer model 1170 in FIG. 11.

Once the DL/ML computer model 1170 is trained through a machine learning process, such as that described previously above for example, the DL/ML computer model can predict the likelihood of a label being associated with an input medical image, e.g., CXR image. To ensure that there are as few irrelevant findings identified while still detecting critical findings, operating points or thresholds for the DL/ML computer model 1470 may be selected from the ROC curves per label such that an objective function reflecting this tradeoff is minimized. Specifically, an objective function $$L(\theta) = -\ln\left(\frac{1}{n}\sum_{i=1}^{n} F1i(\theta)\right)$$

may be formed by averaging the F1 score per image i across all images n of a validation set, where the F1 score represents a measure of the DL/ML computer model's accuracy on a dataset.

The KDR computer model 1450 provides logic, whose parameters are learned through a machine learning process performed by the KDR modification parameter optimization engine 1460, whose objective is to improve the DL/ML computer model 1470 label predictions, or classifications, by leveraging the knowledge of label co-occurrences represented in the normalized label co-occurrence data structure 1422, as generated based on the co-occurrences of findings in the knowledge source data structures of the corpus 1440. The output of the DL/ML computer model 1470, e.g., the classifier's label prediction for each input image in an input dataset 1480, is input to the KDR computer model 1450. The output of the DL/ML computer model 1470 comprises the probabilistic prediction values, e.g., between 0 and 1, for each of the recognized labels in the vocabulary 1430, i.e., the label set. The DL/ML computer model 1470 also provides the threshold for each label which specifies the threshold at which point, or above, the probabilistic value for a given label is determined to represent a true label (1) for the input data 1480, otherwise the label is considered false (0).

Again, the classifier in an example illustrative embodiment is a multi-label classifier, i.e., for a given input there can be one or more labels that are true labels. The threshold for each label may be the same or different, such that a separate threshold value, that is determined during the training of the DL/ML model or classifier, may be specified. A single threshold applicable to all labels may not give optimal performance for all labels depending on the optimization for ROC, precision, or recall, and a separate threshold for each label helps to fine tune each label's performance individually. For example, label A may have a threshold of 0.35 while label B may have threshold of 0.40. This threshold determines if a label is true or not based on the probabilistic predictive value. For example, the label A is true only if it's probabilistic predictive value is equal to or greater than 0.35 while the label B is true only if it's probabilistic predictive value is equal to or greater than 0.40. The number of training samples are different for each label.

The DL/ML computer model 1470 performs its probabilistic prediction operations on a plurality of portions of input data from input data 1480, such as a data representing a plurality of CXR images or other medical images, for example. Thus, a plurality of probabilistic prediction outputs, e.g., vector outputs with vector slots corresponding to each possible output label or class, are generated by the DL/ML computer model 1470 for a plurality of such portions of input data (e.g., medical images). The output from the DL/ML computer model 1470 is split into a KDR development subset 1472 and a KDR testing dataset 1474. The KDR development subset 1472 is used for performing machine learning development of optimal operational parameters for the KDR computer model 1450, including a label co-occurrence boosting threshold, label co-occurrence discounting threshold, boosting delta value, and discounting delta value. The KDR testing dataset 1474 is used to test the operation of the KDR computer model 1450, configured with the optimized operational parameters, on unseen data present in the KDR testing dataset 1474.

The KDR modification parameter optimization engine 1460 comprises logic that operates to determine the optimum values for the thresholds and delta values applied by the KDR computer model 1450 to the outputs generated by the DL/ML computer model 1470 when corresponding labels are identified as "true" in the DL/ML computer model 1470 output. In order to determine the optimum values for these thresholds and delta values, the KDR modification parameter optimization engine 1460 takes each DL/ML computer model 1470 output for each portion of input data in the KDR development subset 1472 and converts that output vector of probability values into a binary vector (0/1) using the label threshold values corresponding to the various labels, e.g., if a probability value for a label is 0.65, but the threshold for that label is 0.70, then the value is converted to a "0" indicating that the label does not apply to the portion of input data, whereas if the probability value were 0.72, then the value would be converted to a "1" indicating that the label does apply to that portion of the input data.

The binary vectors are compared to a ground truth binary vector, e.g., the labels extracted from the corresponding report accompanying the input, for example, for each CXR image study, there is a corresponding radiology report that indicates the correct labels associated with the CXR image study and thus, is the ground truth for the binary vector corresponding to the CXR image study. Based on this comparison, the DL/ML computer model 1470 performance is calculated, e.g., precision, recall, and F1 score, in a manner generally known in the art. These performance metrics provide a baseline performance measurement for the determination of optimal operational parameters of the KDR computer model 1450 that provide maximum improvement upon the baseline performance.

The operational parameters of the KDR computer model 1450 comprise four primary parameters including the label co-occurrence boosting threshold, the label co-occurrence discounting threshold, the boosting delta, and the discounting delta value. The same set of these four operational parameters are applied to each separate label in the labels of the outputs from the DL/ML computer model 1470, although in other illustrative embodiments, different sets of these operational parameters may be learned and applied for the different labels. That is, in an alternative illustrative embodiment, if the DL/ML computer model 1470 recognizes 54 different labels in a label dataset, i.e., the DL/ML computer model 1470 provides an output vector having 54 vector slots, and determines the probabilistic prediction for each label in the 54 different labels, i.e., generates a probability value for each label where the probability value ranges from 0.00 to 1.00 and indicates whether that label applies to a portion of input data form input data 1480, then there may be a separate set of these four parameters for each of the 54 different labels.

The KDR computer model 1450 modifies the label prediction values output by the DL/ML computer model 1470 by analyzing the label prediction values for each label and applying the set of operational parameters to determine whether to boost or discount other label prediction values in the output of the DL/ML computer model 1470. This modification may be performed in a predetermined order, such as from highly co-related label pairs to least co-related label pairs, as indicated by the label prediction values output by the DL/ML computer model 1470.

The label co-occurrence boosting threshold (or boosting threshold (BT)) signifies the threshold for normalized label co-occurrence score above which the KDR computer model 1450 boosts (increases) the predictive value of other label classes. In other words, for a given true label A, the KDR computer model 1450 increases the predictive value of other label classes if they have a normalized co-occurrence score in the normalized label co-occurrence data structure 1422 with label A equal to or above the label co-occurrence boosting threshold. The label co-occurrence discounting threshold (or discounting threshold (DT)) signifies the threshold for normalized label co-occurrence score below which the KDR computer model 1450 discounts (decreases) the predictive value of other label classes. In other words, for a given true label A, the KDR computer model 1450 decreases the predictive value of other label classes if they have a normalized co-occurrence score in the normalized label co-occurrence data structure 1422 with label A below the label co-occurrence discounting threshold. The boosting delta ($\Delta_B$) operational parameter signifies the value by which the KDR computer model 1450 increases the predictive value of co-occurring label classes. The discounting delta ($\Delta_D$) operational parameter signifies the value by which the KDR computer model 1450 decreases the predictive value of co-occurring label classes.

Thus, given a class label in the output of the DL/ML computer model 1470 being true, e.g., a radiology finding is determined to have a sufficiently high probability score to meet or exceed the corresponding threshold for that label for determining whether the label is true or not, the KDR computer model 1450 boosts the predictive value of other label classes, in the output of the DL/ML computer model 1470, that have the normalized label co-occurrence score equal to or above the BT. In addition, the KDR computer model 1450 discounts the predictive value of other label classes in the output of the DL/ML computer model 1470 that have a normalized label co-occurrence score below the DT. The resulting modified output of the DL/ML computer model 1465 may then be output to downstream computing systems 1490.

The objective function of the KDR modification parameter optimization engine 1460 is to determine the optimal values for the four parameters that will maximize the performance of the KDR computer model 1450. To find the optimal values for these parameters, a hyperparameter optimization technique is applied to perform a grid search in the four parameter dimensional space. The grid search operation iterates over multiple combinations of possible values for each parameter. FIG. 15C shows a table of an example of the ranges and delta by which these parameters are increased with each iteration in accordance with one illustrative embodiment. Once the optimum values for the four parameters are found by the KDR modification parameter optimization engine 1460, the KDR computer model 1450 is configured with the optimal parameters such that it applies these optimal parameters to outputs of the DL/ML computer model 1470 to modify the output values, and thereby generate modified output 1465, with the resulting true labels output by the DL/ML computer model 1470 being provided to downstream computing systems 1490, e.g., medical imaging viewers, AI or cognitive computing systems that perform complex analysis, medical recommendations, treatment recommendations, medical diagnosis recommendations or assistance, or the like.

Thus, the illustrative embodiments provide a vocabulary driven concept annotation computing tool to annotate a corpus of knowledge source data structures, e.g., medical imaging reports, with core findings and/or fine grained findings from the vocabulary. The knowledge source data structures are represented as finding vectors which are converted to label vectors based on a findings to label mapping. The label vectors are then used to compute statistical correlations between labels in a label set. A normalized co-occurrence score between labels is determined based on the co-occurrence of labels with other labels in the label set, across all, or a subset of, the knowledge source data structures in the corpus. In addition, the annotated knowledge source data structures and corresponding data, e.g., medical image data, are used to train a DL/ML computer model to generate prediction outputs, or classifications (labels), that are determined to be applicable to the data input.

Outputs from the DL/ML computer model are provided to a knowledge driven reasoning engine that uses the normalized co-occurrence scores between labels as a mechanism to determine whether to boost or discount probability values in the outputs of the DL/ML computer model. A hyperparameter optimization technique is applied to learn the thresholds and delta values to be used to determine when to boost/discount probability values and by how much the probability values should be boosted/discounted in the outputs from the DL/ML computer model. In one illustrative embodiment, this hyperparameter optimization technique comprises a grid search on a four dimensional space corresponding to the four operational parameters of the KDR computer model. However, it should be appreciated that in other illustrative embodiments, rather than using a grid search on the four dimensional space, other multi-dimensional optimization operations, such as a randomized search, halving grid search, halving randomized search, Bayes search, neural network based optimization, or other multi-dimensional hyperparameter optimization technique may be used to find the optimized settings for these four operational parameters.

It should be appreciated that while the above illustrative embodiments are described with regard to embodiments in which both boosting and discounting are applied to the outputs for the DL/ML computer model, the illustrative embodiments are not limited to such. Rather, it has been determined that improvements in performance can be achieved by applying either boosting or discounting, but that the greatest improvement is achieved by applying both boosting and discounting. In a "boosting only" configuration embodiment, for a true label output from the DL/ML computer model, the KDR computer model 1450 boosts (increases) the predictive value (probability score) of other label classes, by a boosting delta $\Delta_B$, that have a normalized label co-occurrence score equal to or above the BT. In the "discounting only" configuration embodiment, for a true label, the KDR computer model 1450 discounts (decreases) the predictive value of other label classes, by a discount delta $\Delta_D$, that have a normalized label co-occurrence score below the DT. In the "boosting and discounting" configuration embodiment, both boosting and discounting are applied as described previously.

FIG. 15D is a table showing performance improvements from the baseline performance across multiple performance metrics in accordance with one illustrative embodiment. As can be seen from FIG. 15D, in accordance with this illustrative embodiment, applying boosting only achieves a 1.51% improvement over the baseline F1 score, applying discounting only achieves a 7.30% improvement over the baseline F1 score, and applying both boosting and discounting achieves a 9.09% improvement over the baseline F1 score. In addition, improvements in precision and recall are seen as well. Thus, by applying one or more of boosting and discounting in accordance with one or more of the illustrative embodiments, an improvement in performance of the trained DL/ML computer model is achieved.

Figure 16:
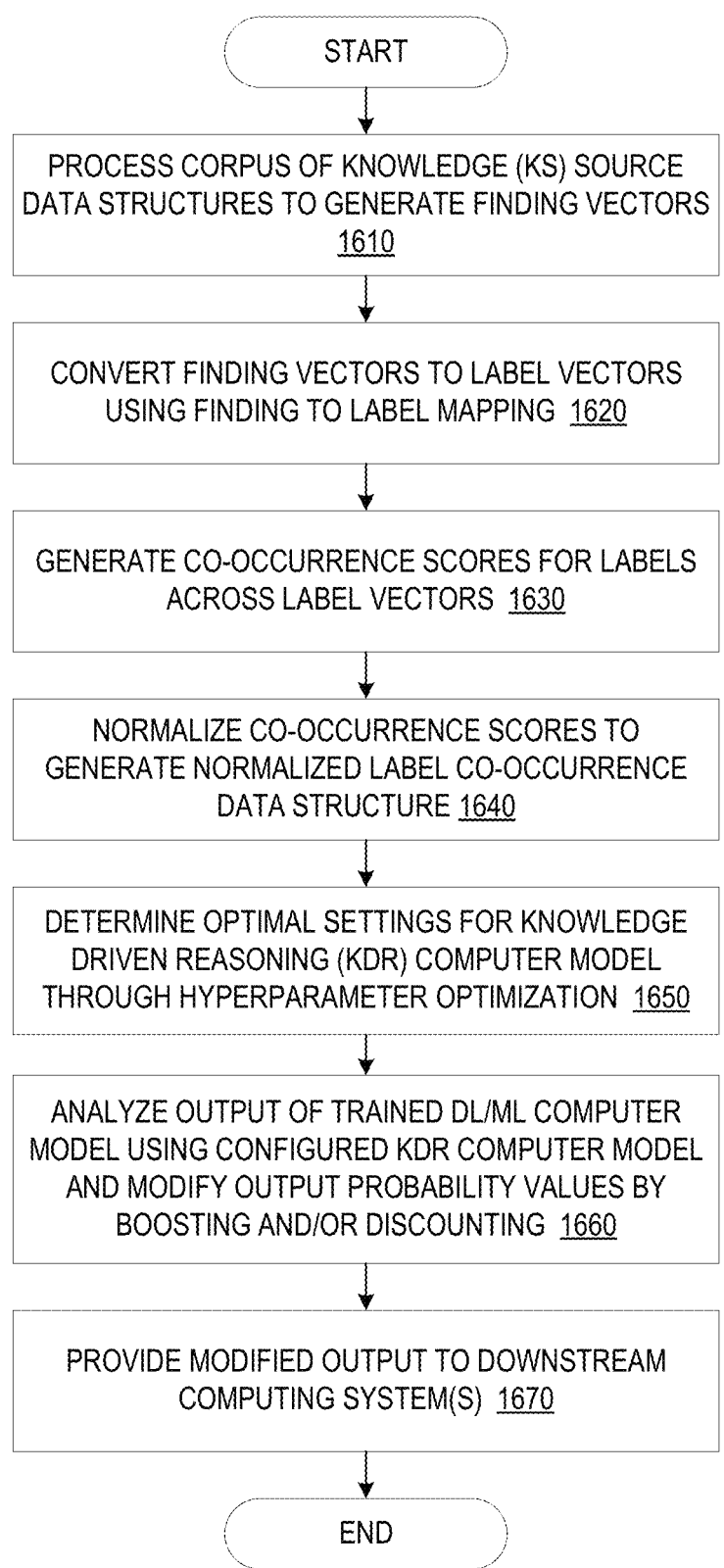
FIG. 16 is a flowchart outlining an example operation of a knowledge driven reasoning engine in accordance with one illustrative embodiment.

FIG. 16 is a flowchart outlining an example operation of a knowledge driven reasoning engine in accordance with one illustrative embodiment. The operation outlined in FIG. 16 may be performed, for example, by one or more specifically configured computing devices of one or more data processing systems, which are specifically configured to implement a knowledge driven reasoning engine, such as 1400 in FIG. 14, and its corresponding computing operations to modify the output probability values generated by a trained DL/ML computer model, such as DL/ML computer model 1470 in FIG. 14. The operation outlined in FIG. 16 assumes that a DL/ML computer model has been trained to generate a predictive output that comprises a vector of probability values for a predetermined label set, or predetermined set of classifications, and corresponding thresholds for these labels that indicate when the corresponding probability value for the label indicates a "true" label. The DL/ML computer model may be trained using annotated input data (e.g., medical image data) and knowledge source data structures (e.g., medical imaging reports) which are annotated using a determined core finding and/or fine grained finding vocabulary.

As shown in FIG. 16, the operation starts by processing a corpus of knowledge source data structures to generate, for each knowledge source data structure, a finding vector representation (step 1610). The finding vector representation for each knowledge source data structure is converted to a label vector representation based on a finding to label mapping present in a vocabulary (step 1620). The label vector representations, across a plurality of the knowledge source data structure, are analyzed to generate co-occurrence scores for labels present in the label vector representations (step 1630). The co-occurrence scores are normalized to generate a normalized label co-occurrence data structure (step 1640).

A knowledge driven reasoning modification optimization engine determines, through a hyperparameter optimization technique, an optimal setting of knowledge driven reasoning parameters for a knowledge driven reasoning computer model (step 1650). The knowledge driven reasoning parameters may include one or more threshold parameters specifying conditions of normalized co-occurrence scores when boosting and/or discounting of prediction scores for labels should be applied and the delta values by which such prediction scores are to be boosted/discounted. Thereafter, when an output is generated by the trained DL/ML computer model, the output is analyzed by the knowledge driven reasoning computer model to apply the knowledge driven reasoning parameters and the normalized co-occurrence scores for the "true" labels in the output to thereby boost/discount other labels in the output (step 1660). This may cause other labels in the output to be boosted such that their probability values meet or exceed the corresponding thresholds for those labels such that they may have been previously considered not true but are now true labels because their co-occurrence with the true label is relatively high. Similarly, this may cause other labels in the output to be decremented such that their probability values may have been previously considered true but are now considered to be not true because their co-occurrence with the true label is relatively low.

The modified output of the DL/ML computer model may then be output to downstream computing systems for use in performing their additional operations (step 1670). For example, the downstream computing systems may provide an image viewer through which the medical images in the input data may be viewed along with the labels determined to be true by the DL/ML computer model being provided or used to augment the medical image output with annotations or other visual representations of the true labels. In another example, the modified output may be used to automatically generate a medical imaging report, such as in co-pending and commonly assigned U.S. patent application Ser. No. 17/061,628 referenced above. In still other examples, the modified output may be provided to downstream artificial intelligence or cognitive computing systems that utilize the output labels to perform AI/cognitive analysis to support decision making, diagnostics, recommendations, or the like. The operation then terminates.

Figure 17:
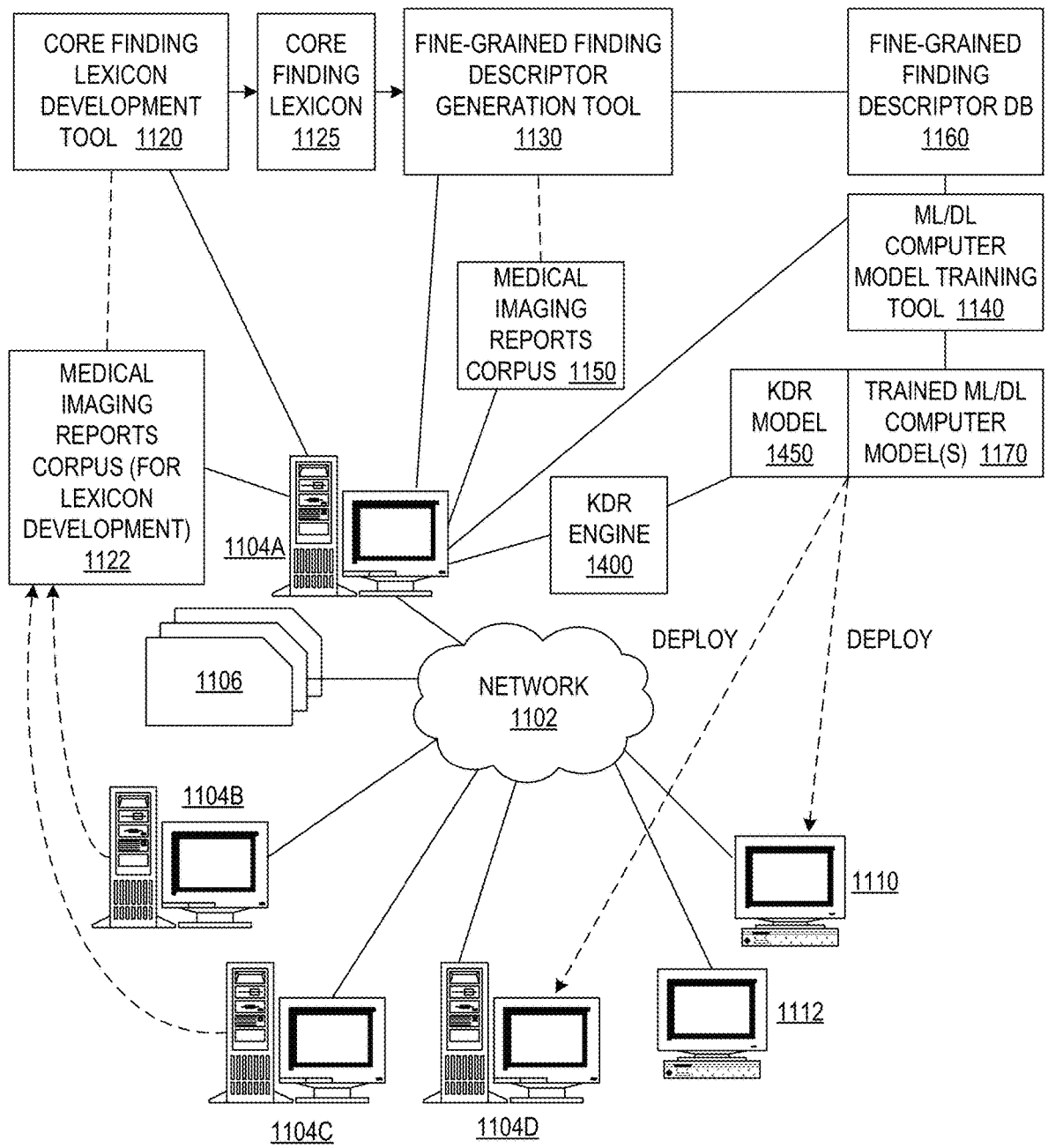
FIG. 17 is an example diagram of a distributed data processing system, such as that shown in FIG. 11 above, augmented to include the knowledge driven reasoning engine in accordance with one illustrative embodiment.

FIG. 17 is an example diagram of a distributed data processing system, such as that shown in FIG. 11 above, augmented to include the knowledge driven reasoning engine in accordance with one illustrative embodiment. The underlying hardware mechanisms of computing devices that may be specifically configured to be specialized computing tools that operate as elements of the illustrative embodiments may be similar to that shown in FIG. 12 above. The distributed data processing system of FIG. 17 operates as described above with regard to FIG. 11, but with the addition of the knowledge driven reasoning engine 1400 of FIG. 14 operating on the output of the trained ML/DL computer model(s) 1170. The knowledge driven reasoning engine may operate to configure a KDR computer model 1450 for operation with the ML/DL computer model(s) 1170. As such, the configured KDR computer model 1450 may be distributed along with the trained ML/DL computer model(s) 1170 to the client and/or server computing systems that implement these models and may operate in conjunction with these ML/DL computer model(s) 1170 so as to modify the outputs of the ML/DL computer model(s) 1170. It should be appreciated that these ML/DL computer model(s) 1170 and the corresponding KDR computer model 1440 may be part of, or operate with, other downstream computing systems or algorithms executing on the computing device(s) to which the computer models 1170 and 1440 are distributed or with which they operate. It should be appreciated that the KDR reasoning engine 1400 may configure the KDR computer model 1450 in the manner previously described above based on a corpus of medical imaging reports, such as corpus 1122 or 1150 and an established vocabulary, such as may include core finding lexicon 1125 and/or fine grained finding descriptor database 1160.

As described above, the illustrative embodiments of the present invention are specifically directed to an improved computing tool that improves the performance of a trained deep learning or machine learning computer model and improves the outputs generated by the deep learning or machine learning computer model by leveraging knowledge in knowledge source data structures. In some illustrative embodiments, these knowledge source data structures are medical imaging report data structures, such as radiology reports, that accompany the medical imaging data, such as chest X-rays (CXRs). In other illustrative embodiments, the knowledge source data structures are any suitable textual content that describes other data that is the subject of prediction/classification operations by a deep learning or machine learning computer model.

It should be appreciated that the functions of the illustrative embodiments as described herein are intended to be performed using automated processes without human intervention. While a human being, e.g., a patient, may be the subject of the data, e.g., the medical imaging, or may be involved in the generation of inputs, the illustrative embodiments of the present invention are not directed to actions performed by the human being, but rather logic and functions performed specifically by the improved computing tool on the data and knowledge source data structures, e.g., medical images taken of the patient and corresponding medical imaging reports. Moreover, even though the present invention may provide an output to a downstream computing system that ultimately assists human beings in performing decision making or otherwise understanding the input data and what it represents, e.g., evaluating the medical condition of the patient, the illustrative embodiments of the present invention are not directed to actions performed by the human being viewing the results of the processing performed by the illustrative embodiments, but rather to the specific operations performed by the specific improved computing tool of the present invention which facilitate the processing by the illustrative embodiments in an improved manner and ultimately the generation of the results of the processing that assists the human being. Thus, the illustrative embodiments are not organizing any human activity, but are in fact directed to the automated logic and functionality of an improved computing tool.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for modifying an output of a trained machine learning (ML) computer model based on label co-occurrence statistics to provide an improved ML computer model output, the method comprising:
   generating, for each source knowledge data structure in a corpus comprising a plurality of source knowledge data structures, a label vector representation of the source knowledge data structure to thereby generate a plurality of label vector representations;
   determining co-occurrence scores for each pairing of labels in a plurality of labels, by generating statistical measures of the co-occurrence of labels in the pairings of labels across the plurality of label vector representations, to thereby generate a label co-occurrence data structure;
   receiving an output of the ML computer model, wherein the output is a vector output specifying probability values associated with labels in the plurality of labels;
   configuring a knowledge driven reasoning (KDR) computer model with at least one threshold and at least one delta value, wherein the at least one threshold specifies a condition of a co-occurrence of a first label in the output of the ML computer model with a second label in the plurality of labels which, if present, causes the at least one delta value to be applied to modify a probability value associated with the second label in the output of the ML computer model;
   executing the KDR computer model on the output of the ML computer model to modify one or more probability values in the output of the ML computer model and generate a modified output of the ML computer model; and
   outputting the modified output to a downstream computing system.

2. The method of claim 1, wherein the at least one threshold comprises at least one of a label co-occurrence boosting threshold specifying a first threshold co-occurrence score, where in response to a co-occurrence score in the label co-occurrence data structure being equal to or above the first threshold co-occurrence score, the KDR computer model increases a corresponding probability value in the output of the ML computer model, or a label co-occurrence discounting threshold specifying a second threshold co-occurrence score, where in response to a co-occurrence score in the label co-occurrence data structure being less than the second threshold co-occurrence score, the KDR computer model decreases a corresponding probability value in the output of the ML computer model.

3. The method of claim 2, wherein the at least one delta value comprises at least one of a boost delta value specifying a first incremental value by which the corresponding probability value is increased in response to the co-occurrence score being equal to or above the first threshold co-occurrence score, or a discount delta value specifying a second incremental value by which the corresponding probability value is decreased in response to the co-occurrence score being less than the second threshold co-occurrence score.

4. The method of claim 3, wherein the at least one threshold comprises both the label co-occurrence boosting threshold and the label co-occurrence discounting threshold, and wherein the at least one delta value comprises both the boost delta value and the discount delta value.

5. The method of claim 3, wherein each label in the output of the ML computer model has an associated label threshold value indicating a probability value for the label at which the label is determined to be a true label for the input, and wherein at least one delta value modifies the probability value to be above or below the associated label threshold value.

6. The method of claim 1, wherein the ML computer model is trained to process input medical image data to predict labels associated with structures, anomalies, or medical conditions depicted in the input medical image data, and wherein the knowledge source data structures are medical imaging reports associated with the input medical image data.

7. The method of claim 1, wherein the statistical measures of the co-occurrence of labels in the pairings of labels across the plurality of label vector representations comprises, for each pairing of labels, a count of a number of times both labels in the pairing of labels, appear in source knowledge data structures of the plurality of source knowledge data structures.

8. The method of claim 1, wherein specific settings for the at least one threshold and at least one delta value are determined through a machine learning hyperparameter optimization operation.

9. The method of claim 8, wherein the hyperparameter optimization operation comprises at least one of a grid search, randomized search, halving grid search, halving randomized search, Bayes search, or neural network based optimization.

10. The method of claim 1, wherein the ML computer model is trained to process chest X-ray image data to predict labels associated with structures, anomalies, or medical conditions depicted in the chest X-ray image data, and wherein the knowledge source data structures are chest X-ray radiology reports associated with the chest X-ray image data.

11. A computer program product comprising a computer readable storage medium having a computer readable program stored therein, wherein the computer readable program, when executed on a computing device, causes the computing device to:

generate, for each source knowledge data structure in a corpus comprising a plurality of source knowledge data structures, a label vector representation of the source knowledge data structure to thereby generate a plurality of label vector representations;

determine co-occurrence scores for each pairing of labels in a plurality of labels, by generating statistical measures of the co-occurrence of labels in the pairings of labels across the plurality of label vector representations, to thereby generate a label co-occurrence data structure;

receive an output of a machine learning (ML) computer model, wherein the output is a vector output specifying probability values associated with labels in the plurality of labels;

configure a knowledge driven reasoning (KDR) computer model with at least one threshold and at least one delta value, wherein the at least one threshold specifies a condition of a co-occurrence of a first label in the output of the ML computer model with a second label in the plurality of labels which, if present, causes the at least one delta value to be applied to modify a probability value associated with the second label in the output of the ML computer model;

execute the KDR computer model on the output of the ML computer model to modify one or more probability values in the output of the ML computer model and generate a modified output of the ML computer model; and output the modified output to a downstream computing system.

12. The computer program product of claim 11, wherein the at least one threshold comprises at least one of a label co-occurrence boosting threshold specifying a first threshold co-occurrence score, where in response to a co-occurrence score in the label co-occurrence data structure being equal to or above the first threshold co-occurrence score, the KDR computer model increases a corresponding probability value in the output of the ML computer model, or a label co-occurrence discounting threshold specifying a second threshold co-occurrence score, where in response to a co-occurrence score in the label co-occurrence data structure being less than the second threshold co-occurrence score, the KDR computer model decreases a corresponding probability value in the output of the ML computer model.

13. The computer program product of claim 12, wherein the at least one delta value comprises at least one of a boost delta value specifying a first incremental value by which the corresponding probability value is increased in response to the co-occurrence score being equal to or above the first threshold co-occurrence score, or a discount delta value specifying a second incremental value by which the corresponding probability value is decreased in response to the co-occurrence score being less than the second threshold co-occurrence score.

14. The computer program product of claim 13, wherein the at least one threshold comprises both the label co-occurrence boosting threshold and the label co-occurrence discounting threshold, and wherein the at least one delta value comprises both the boost delta value and the discount delta value.

15. The computer program product of claim 13, wherein each label in the output of the ML computer model has an associated label threshold value indicating a probability value for the label at which the label is determined to be a true label for the input, and wherein at least one delta value modifies the probability value to be above or below the associated label threshold value.

16. The computer program product of claim 11, wherein the ML computer model is trained to process input medical image data to predict labels associated with structures, anomalies, or medical conditions depicted in the input medical image data, and wherein the knowledge source data structures are medical imaging reports associated with the input medical image data.

17. The computer program product of claim 11, wherein the statistical measures of the co-occurrence of labels in the pairings of labels across the plurality of label vector representations comprises, for each pairing of labels, a count of a number of times both labels in the pairing of labels, appear in source knowledge data structures of the plurality of source knowledge data structures.

18. The computer program product of claim 11, wherein specific settings for the at least one threshold and at least one delta value are determined through a machine learning hyperparameter optimization operation.

19. The computer program product of claim 18, wherein the hyperparameter optimization operation comprises at least one of a grid search, randomized search, halving grid search, halving randomized search, Bayes search, or neural network based optimization.

20. An apparatus comprising:
at least one processor; and
at least one memory coupled to the at least one processor, wherein the at least one memory comprises instructions which, when executed by the at least one processor, cause the at least one processor to:

generate, for each source knowledge data structure in a corpus comprising a plurality of source knowledge data structures, a label vector representation of the source knowledge data structure to thereby generate a plurality of label vector representations;

determine co-occurrence scores for each pairing of labels in a plurality of labels, by generating statistical measures of the co-occurrence of labels in the pairings of labels across the plurality of label vector representations, to thereby generate a label co-occurrence data structure;

receive an output of a machine learning (ML) computer model, wherein the output is a vector output specifying probability values associated with labels in the plurality of labels;

configure a knowledge driven reasoning (KDR) computer model with at least one threshold and at least one delta value, wherein the at least one threshold specifies a condition of a co-occurrence of a first label in the output of the ML computer model with a second label in the plurality of labels which, if present, causes the at least one delta value to be applied to modify a probability value associated with the second label in the output of the ML computer model;

execute the KDR computer model on the output of the ML computer model to modify one or more probability values in the output of the ML computer model and generate a modified output of the ML computer model; and output the modified output to a downstream computing system.

* * * * *